(12) United States Patent
Sato et al.

(10) Patent No.: US 9,866,779 B2
(45) Date of Patent: Jan. 9, 2018

(54) IMAGING APPARATUS, IMAGING SYSTEM, RECONSTRUCTION APPARATUS, IMAGING METHOD, AND RECORDING MEDIUM

(71) Applicant: Panasonic Intellectual Property Management Co., Ltd., Osaka (JP)

(72) Inventors: Satoshi Sato, Kyoto (JP); Takeo Azuma, Kyoto (JP); Kunio Nobori, Osaka (JP); Mikiya Nakata, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 246 days.

(21) Appl. No.: 14/963,001

(22) Filed: Dec. 8, 2015

(65) Prior Publication Data

US 2016/0205336 A1 Jul. 14, 2016

(30) Foreign Application Priority Data

Jan. 9, 2015 (JP) .................................. 2015-003089

(51) Int. Cl.
*H04N 5/378* (2011.01)
*H04N 19/122* (2014.01)
(Continued)

(52) U.S. Cl.
CPC ............. *H04N 5/378* (2013.01); *H04N 5/335* (2013.01); *H04N 5/347* (2013.01); *H04N 5/357* (2013.01);
(Continued)

(58) Field of Classification Search
CPC ...... H04N 3/155; H04N 5/2355; H04N 5/347; H04N 5/355; H04N 5/3532; H04N 5/3575;
(Continued)

(56) References Cited

U.S. PATENT DOCUMENTS 9,584,745 B2 * 2/2017 Ladd ...................... H04N 5/347
2003/0076432 A1 * 4/2003 Luo ........................ H04N 3/155
348/308

(Continued)

OTHER PUBLICATIONS

J. Ma, "Improved Iterative Curvelet Thresholding for Compressed Sensing and Measurement", IEEE Transactions on Instrumentation and Measurement, vol. 60, No. 1, pp. 126-136, 2011.

(Continued)

*Primary Examiner* — Nhan T Tran
*Assistant Examiner* — Chriss Yoder, III
(74) *Attorney, Agent, or Firm* — Wenderoth, Lind & Ponack, L.L.P.

(57) ABSTRACT

An imaging apparatus includes a photoelectric converter that converts light signals generated from light received by three or more pixels into electric charge signals, each of the electric charge signals corresponding to one of the three or more pixels; an electric charge holder that holds the electric charge signals; an analog selective adder that generates added electric charge signals by adding electric charge signals of certain pixels among the three or more pixels by using analog addition patterns which are rules of adding pieces of electric charge information corresponding to individual positions of the certain pixels; an analog-to-digital converter that converts the added electric charge signals into digital signals; and an addition data compressor that compresses the digital signals by using a total number of pixels for which pieces of electric charge information are added in the analog addition patterns and thereby generates compressed digital signals.

17 Claims, 20 Drawing Sheets

(51) Int. Cl.
| | |
|---|---|
| *H04N 19/13* | (2014.01) |
| *H04N 19/80* | (2014.01) |
| *H04N 5/355* | (2011.01) |
| *H04N 5/357* | (2011.01) |
| *H04N 5/374* | (2011.01) |
| *H04N 5/3745* | (2011.01) |
| *H04N 5/335* | (2011.01) |
| *H04N 5/347* | (2011.01) |
| *H04N 19/60* | (2014.01) |

(52) U.S. Cl.
CPC ......... *H04N 5/3559* (2013.01); *H04N 5/3742* (2013.01); *H04N 5/37455* (2013.01); *H04N 19/122* (2014.11); *H04N 19/13* (2014.11); *H04N 19/80* (2014.11); *H04N 19/60* (2014.11)

(58) Field of Classification Search
CPC .. H04N 5/363; H04N 5/3745; H04N 5/37455; H04N 5/37457; H04N 5/378; H04N 19/12; H04N 19/136; H04N 19/172; H04N 19/192; H04N 19/60; H01L 27/14643–27/14663
See application file for complete search history.

(56) References Cited

U.S. PATENT DOCUMENTS

2008/0260298 A1* 10/2008 Kamon ................. H04N 3/155
    382/321
2009/0101798 A1* 4/2009 Yadid-Pecht ........ H04N 5/3532
    250/208.1

OTHER PUBLICATIONS

Y. Oike et al., "A 256×256 CMOS Image Sensor with ΔΣ-Based Single-Shot Compressed Sensing", IEEE International Solid-State Circuits Conference (ISSCC) Dig. of Tech. Papers, pp. 386-387, 2012.

Satoshi Sato et al., "Compressive Sensing Reconstruction Using Local Spatial Similarity among Color Channels", The 17th Meeting on Image Recognition and Understanding (MIRU), 2014.

Toshiyuki Tanaka, "Mathematics of Compressed Sensing", IEICE Fundamentals Review, vol. 4, No. 1, pp. 39-47, 2010 (PArtial Translation).

J. Zhang et al., "Compressed Sensing Recovery via Collaborative Sparsity", Proc. of IEEE Data Compression Conference, pp. 287-296, 2012.

Toshihide Ibaraki et al., "Saitekika no Shuhou", Jouhou Suugaku Kouza, vol. 14 out of a total of 15 volumes, pp. 159-164, Kyoritsu Shuppan Co., Ltd,1993 (Partial Translation).

Manya V. Afonso et al., "Fast Image Recovery Using Variable Splitting and Constrained Optimization" IEEE Transactions on Image Processing, vol. 19, No. 9, pp. 2345-2356, 2010.

* cited by examiner

FIG. 8

| SAMPLING PATTERN | CODED DATA OF ADDITION SAMPLING INFORMATION |
|---|---|
| 1 | 1100 1100 0000 0000<br>0011 0011 0000 0000<br>0000 0000 1100 1100<br>0000 0000 0011 0011<br>1000 0100 0010 0001<br>0010 0001 1000 0100<br>0100 1000 0001 0010<br>0001 0010 0100 1000 |
| 2 | 1100 1100 0000 0000<br>0011 0011 0000 0000<br>0000 0000 1100 1100<br>0000 0000 0011 0011<br>0100 0010 1000 0000<br>0010 1000 0001 0110<br>0001 0100 0010 1000<br>1000 0010 0100 0001 |

FIG. 9

| SAMPLING PATTERN | CODED DATA OF ADDITION SAMPLING INFORMATION |
|---|---|
| 3 | 1100 1100 0000 0000<br>0011 0011 0000 0000<br>0000 0000 1100 1100<br>0000 0000 0011 0011<br>1000 0101 0100 0010<br>0010 0000 1000 0001<br>0100 1010 0001 1000<br>0001 0000 0010 0000 |

FIG. 10A

|   | x=1 | x=2 | x=3 | x=4 | x=5 | x=6 |
|---|---|---|---|---|---|---|
| y=1 | ① | ② | ③ | ④ | ① | ② |
| y=2 | ⑤ | ⑥ | ⑦ | ⑧ | ⑤ | ⑥ |
| y=3 | ⑨ | ⑩ | ⑪ | ⑫ | ⑨ | ⑩ |
| y=4 | ⑬ | ⑭ | ⑮ | ⑯ | ⑬ | ⑭ |
| y=5 | ① | ② | ③ | ④ | ① | ② |
| y=6 | ⑤ | ⑥ | ⑦ | ⑧ | ⑤ | ⑥ | t=t1     301

FIG. 10B

| ② | ③ | ④ | ① | ② | ⑤ |
|---|---|---|---|---|---|
| ⑥ | ⑦ | ⑧ | ⑤ | ⑥ | ⑨ |
| ⑩ | ⑪ | ⑫ | ⑨ | ⑩ | ⑬ |
| ⑭ | ⑮ | ⑯ | ⑬ | ⑭ | ① |
| ② | ③ | ④ | ① | ② | ⑤ |
| ⑥ | ⑦ | ⑧ | ⑤ | ⑥ | ① | t=t2

FIG. 10C

| ③ | ④ | ① | ② | ⑤ | ⑥ |
|---|---|---|---|---|---|
| ⑦ | ⑧ | ⑤ | ⑥ | ⑨ | ⑩ |
| ⑪ | ⑫ | ⑨ | ⑩ | ⑬ | ⑭ |
| ⑮ | ⑯ | ⑬ | ⑭ | ① | ② |
| ③ | ④ | ① | ② | ⑤ | ⑥ |
| ⑦ | ⑧ | ⑤ | ⑥ | ① | ② | t=t3

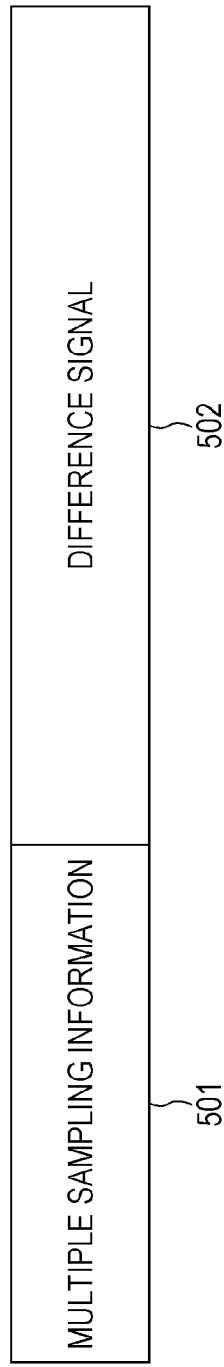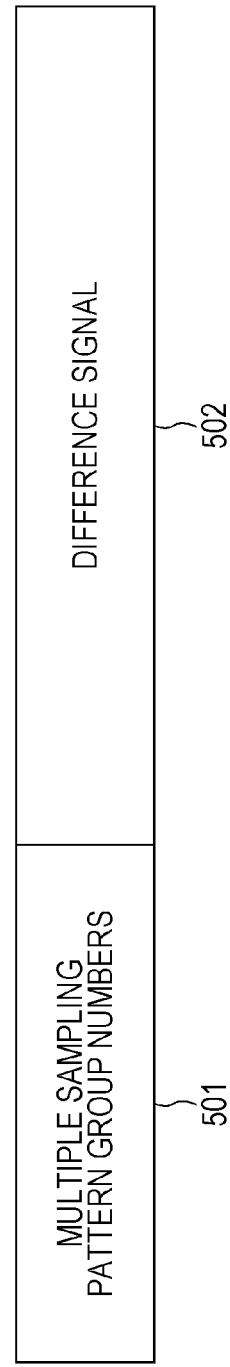

FIG. 18

| 1 | ①②③④①② ⑤⑥⑦⑧⑤⑥<br>⑨⑩⑪⑫⑨⑩ ⑬⑭⑮⑯⑬⑭<br>①②③④①② ⑤⑥⑦⑧⑤⑥ |
|---|---|
| 2 | ②③④⑤②③ ⑥⑦⑧⑨⑥⑦<br>⑩⑪⑫⑬⑩⑪ ⑭⑮⑯①⑭⑮<br>②③④⑤②③ ⑥⑦⑧⑨⑥⑦ |
| 3 | ③④⑤⑥③④ ⑦⑧⑨⑩⑦⑧<br>⑪⑫⑬⑭⑪⑫ ⑮⑯①②⑮⑯<br>③④⑤⑥③④ ⑦⑧⑨⑩⑦⑧ |

IMAGING APPARATUS, IMAGING SYSTEM, RECONSTRUCTION APPARATUS, IMAGING METHOD, AND RECORDING MEDIUM

BACKGROUND

1. Technical Field

The present disclosure relates to an imaging system using compressed sensing, and a transmission scheme for image data generated by the imaging system.

2. Description of the Related Art

In recent years, a technique called "compressed sensing" has been developed. Compressed sensing is a technique for compressing images by adding pixel values (electric charge signals) of a plurality of pixels during imaging and reconstructing the image by using sparsity of the image (see, for example, J. Ma, "Improved Iterative Curvelet Thresholding for Compressed Sensing and Measurement", IEEE Transactions on Instrumentation and Measurement, vol. 60, no. 1, pp. 126-136, 2011). Imaging based on this technique is called "multiple sampling imaging".

Normally, multiple sampling imaging may cause loss in information amount of an image, resulting in significant degradation of quality of a reconstruction image. However, in compressed sensing, reconstruction processing is performed by using sparsity of an image, and accordingly a reconstruction image having quality equivalent to that of a non-compressed image can be obtained, with an amount of data being reduced by multiple sampling imaging. Here, "sparsity of an image" means that, when an image is projected to a wavelet space or a discrete cosine transform (DCT) space, many coefficient values become almost zero. As an image reconstruction method using sparsity of an image, L0-norm minimization or L1-norm minimization is used in compressed sensing.

In compressed sensing, an amount of data can be reduced by performing simple addition processing before performing processing with an analog-to-digital converter (hereinafter referred to as an ADC) in an imaging device, and thus it is possible to lower the drive frequency of the ADC. Accordingly, lower power consumption, a higher SN ratio, and a reduced communication band can be realized.

The above-mentioned paper of J. Ma discloses a method for applying compressed sensing to an image by using the Improved Iterative Curvelet Thresholding method.

Also, for example, Y. Oike and A. E. Gamal, "A 256×256 CMOS Image Sensor with ΔΣ-Based Single-Shot Compressed Sensing", IEEE International Solid-State Circuits Conference (ISSCC) Dig. of Tech. Papers, pp. 386-387, 2012 discloses a solid-state imaging device using the concept of compressed sensing. In this solid-state imaging device, a plurality of pixels are respectively connected to a plurality of different lines. The solid-state imaging device sequentially drives a plurality of pixels in a pixel group at timings of shifted phases and thereby reads out signals. With this configuration, a solid-state imaging device including a reduced number of additional circuits, requiring no sample and hold circuit, and capable of preventing degradation of image quality due to increased noise, an increase in area, and decreased speed is obtained.

SUMMARY

It is widely performed to compress image data obtained through imaging to reduce the amount of the image data before transmitting it. In a compression and transmission technique according to the related art, correlation with neighbor pixels or neighbor blocks is used to calculate a difference. However, in compressed sensing, not all pixel values are obtained as digital data but digital data is obtained through multiple sampling imaging, as described above, and thus a compression method different from a differencing processing according to the related art is necessary.

One non-limiting and exemplary embodiment provides a technique for compressing data obtained through imaging by using compressed sensing.

In one general aspect, the techniques disclosed here feature an imaging apparatus including a photoelectric converter, an electric charge holder, an analog selective adder, an analog-to-digital converter, and an addition data compressor. The photoelectric converter converts light signals generated from light received by three or more pixels into electric charge signals, each of the electric charge signals corresponding to one of the three or more pixels. The electric charge holder holds the electric charge signals for the three or more pixels resulting from conversion. The analog selective adder generates a plurality of added electric charge signals by adding electric charge signals of a certain plurality of pixels among the three or more pixels by using a plurality of analog addition patterns which are rules of adding pieces of electric charge information corresponding to individual positions of the certain plurality of pixels. The analog-to-digital converter converts the plurality of added electric charge signals into a plurality of digital signals. The addition data compressor compresses the plurality of digital signals by using a total number of pixels for which pieces of electric charge information are added in the plurality of analog addition patterns and thereby generates compressed digital signals.

According to an embodiment of the present disclosure, selective addition processing can be performed while changing an multiple sampling pattern spatially and/or temporally, and compression processing can be performed in units of pieces of data on which addition processing has been performed by using the same sampling pattern. The pieces of data on which addition processing has been performed by using the same sampling pattern are highly correlated, and accordingly transmission data can be compressed more efficiently.

It should be noted that general or specific embodiments may be implemented as a system, a method, an integrated circuit, a computer program, a computer-readable recording medium, or any selective combination thereof. The computer-readable recording medium includes a nonvolatile recording medium, for example, a compact disc-read only memory (CD-ROM) or the like.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a schematic diagram illustrating an example of a multiple sampling information table as an example of a method for expressing coded data;

FIG. 9 is a schematic diagram illustrating an example of a multiple sampling information table as an example of a method for expressing coded data;

FIG. 10A is a diagram schematically illustrating a sampling pattern at time t=t1;

FIG. 10B is a diagram schematically illustrating a sampling pattern at time t=t2;

FIG. 10C is a diagram schematically illustrating a sampling pattern at time t=t3;

FIG. 16 is a diagram illustrating an example of a transmission format for transmitting multiple sampling information and a difference signal representing a difference between output signal vectors;

FIG. 17 is a diagram illustrating an example of a transmission format in a case where multiple sampling pattern group numbers are described in a header portion;

FIG. 18 is a schematic diagram illustrating an example of multiple sampling pattern group numbers;

DETAILED DESCRIPTION

Figure 1:
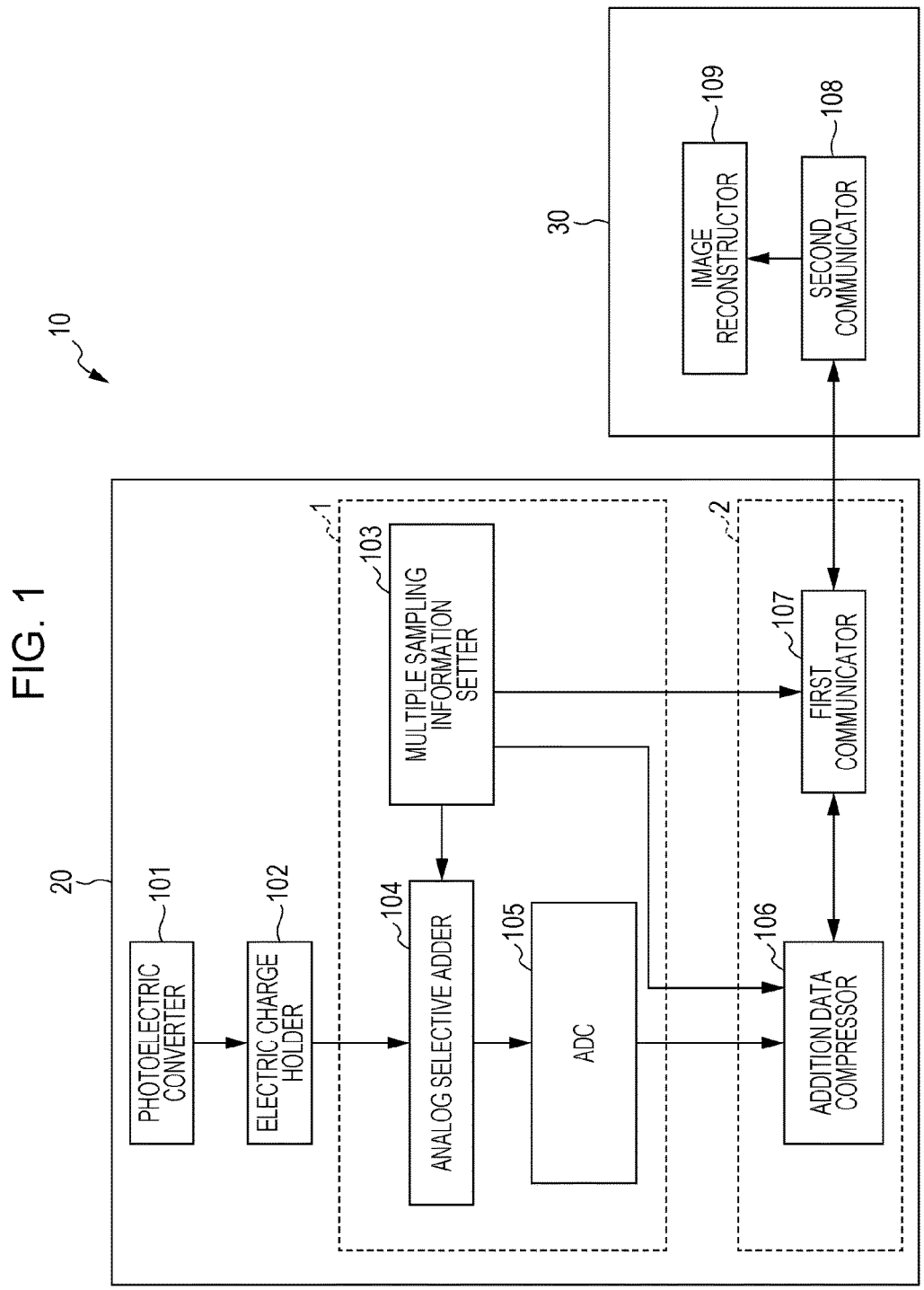
FIG. 1 is a diagram illustrating the configuration of an imaging system according to an exemplary embodiment of the present disclosure.

The inventors continued studies to find out a new processing method as a compression method different from differencing processing according to the related art.

The outline of embodiments of the present disclosure is as follows.

An imaging apparatus according to an embodiment of the present disclosure includes a photoelectric converter that converts light signals generated from light received by three or more pixels into electric charge signals, each of the electric charge signals corresponding to one of the three or more pixels; an electric charge holder that holds the electric charge signals for the three or more pixels resulting from conversion; an analog selective adder that generates a plurality of added electric charge signals by adding electric charge signals of a certain plurality of pixels among the three or more pixels by using a plurality of analog addition patterns which are rules of adding pieces of electric charge information corresponding to individual positions of the certain plurality of pixels; an analog-to-digital converter that converts the plurality of added electric charge signals into a plurality of digital signals; and an addition data compressor that compresses the plurality of digital signals by using a total number of pixels for which pieces of electric charge information are added in the plurality of analog addition patterns and thereby generates compressed digital signals.

The addition data compressor calculates an average value or a median value of the plurality of digital signals resulting from conversion performed by the analog-to-digital converter, compresses difference signals each representing a difference between the calculated average value or median value and a corresponding one of the plurality of digital signals, and thereby generates compressed digital signals.

The addition data compressor compresses the plurality of digital signals by using entropy coding and thereby generates compressed digital signals.

The imaging apparatus further includes a first communicator that transmits the compressed digital signals and the plurality of analog addition patterns.

The first communicator transmits the compressed digital signals and the plurality of analog addition patterns by using a first format in which a header portion includes the plurality of analog addition patterns and a body portion includes the compressed digital signals or a second format in which a header portion includes the compressed digital signals and a body portion includes the plurality of analog addition patterns.

The plurality of analog addition patterns in the header portion in the first format are encrypted, and the plurality of analog addition patterns in the body portion in the second format are encrypted.

An imaging apparatus according to another embodiment of the present disclosure includes a photoelectric converter that converts light signals generated from light received by three or more pixels into electric charge signals, each of the electric charge signals corresponding to one of the three or more pixels; an electric charge holder that holds the electric charge signals for the three or more pixels resulting from conversion; an analog selective adder that generates a plurality of added electric charge signals by adding electric charge signals of a certain plurality of pixels among the three or more pixels by using a plurality of analog addition patterns which are rules of adding pieces of electric charge information corresponding to individual positions of the certain plurality of pixels by applying a weight to the pieces of electric charge information; an analog-to-digital converter that converts the plurality of added electric charge signals into a plurality of digital signals; and an addition data compressor that compresses the plurality of digital signals by using an addition result of the pieces of electric charge information with the weight in the plurality of analog addition patterns and thereby generates compressed digital signals.

An imaging system according to another embodiment of the present disclosure includes the foregoing imaging apparatus and a reconstruction apparatus. The reconstruction apparatus includes a second communicator that receives the compressed digital signals and the plurality of analog addition patterns, and an image reconstructor that decompresses the compressed digital signals by using the plurality of analog addition patterns and obtains image information generated through imaging performed by the imaging apparatus.

As another embodiment of the present disclosure, there is provided a reconstruction apparatus included in the foregoing imaging system.

An imaging method according to another embodiment of the present disclosure includes converting light signals generated from light received by three or more pixels into electric charge signals, each of the electric charge signals corresponding to one of the three or more pixels; generating a plurality of added electric charge signals by adding electric charge signals of a certain plurality of pixels among the three or more pixels by using a plurality of analog addition patterns which are rules of adding pieces of electric charge information corresponding to individual positions of the certain plurality of pixels; converting the plurality of added electric charge signals into a plurality of digital signals; and compressing the plurality of digital signals by using a total number of pixels for which pieces of electric charge information are added in the plurality of analog addition patterns and thereby generating compressed digital signals.

The imaging method further includes transmitting the compressed digital signals and the plurality of analog addition patterns.

In the imaging method, the transmitting includes transmitting the compressed digital signals and the plurality of analog addition patterns by using a first format in which a header portion includes the plurality of analog addition patterns and a body portion includes the compressed digital signals or a second format in which a header portion includes the compressed digital signals and a body portion includes the plurality of analog addition patterns.

In the imaging method, the plurality of analog addition patterns in the header portion in the first format are encrypted, the plurality of analog addition patterns in the body portion in the second format are encrypted, and the transmitting includes transmitting the compressed digital signals and the plurality of analog addition patterns by using a first format in which a header portion includes the plurality of analog addition patterns that are encrypted and a body portion includes the compressed digital signals or a second format in which a header portion includes the compressed digital signals and a body portion includes the plurality of analog addition patterns that are encrypted.

A recording medium according to another embodiment of the present disclosure stores a control program that causes an apparatus including a processor to perform processing. The recording medium is non-volatile and computer-readable. The processing includes converting light signals generated from light received by three or more pixels into electric charge signals, each of the electric charge signals corresponding to one of the three or more pixels; generating a plurality of added electric charge signals by adding electric charge signals of a certain plurality of pixels among the three or more pixels by using a plurality of analog addition patterns which are rules of adding pieces of electric charge information corresponding to individual positions of the certain plurality of pixels; converting the plurality of added electric charge signals into a plurality of digital signals; and compressing the plurality of digital signals by using a total number of pixels for which pieces of electric charge information are added in the plurality of analog addition patterns and thereby generating compressed digital signals.

In the recording medium, the processing further includes transmitting the compressed digital signals and the plurality of analog addition patterns.

An imaging apparatus according to another embodiment of the present disclosure includes a photoelectric converter that includes a first plurality of pixels which receive light and which output a first plurality of electric charge signals, the first plurality of pixels corresponding to the first plurality of electric charge signals in a one-to-one relationship, and each of the first plurality of pixels outputting a corresponding one of the first plurality of electric charge signals; an analog selective adder that outputs a plurality of added electric charge signals, the plurality of added electric charge signals corresponding to a plurality of pieces of designation information in a one-to-one relationship, each of the plurality of added electric charge signals being obtained by adding a plurality of electric charge signals output from a plurality of pixels designated by a corresponding one of the plurality of pieces of designation information, the plurality of pieces of designation information being different from one another, the plurality of pixels that are designated corresponding to the plurality of electric charge signals in a one-to-one relationship, the plurality of pixels that are designated being included in the first plurality of pixels, and the plurality of electric charge signals being included in the first plurality of electric charge signals; an analog-to-digital converter that converts each of the plurality of added electric charge signals into a digital value and thereby outputs a plurality of digital values; and an addition data compressor that generates a first plurality of digital values by using the plurality of digital values and a total number of the plurality of pixels that are designated. A total number of the first plurality of electric charge signals is larger than a total number of the plurality of added electric charge signals, and the total number of the plurality of added electric charge signals is larger than a total number of the plurality of electric charge signals.

The addition data compressor may obtain, based on values obtained by dividing each of the plurality of digital values by the total number of the plurality of pixels, the first plurality of digital values.

Hereinafter, an exemplary embodiment of the present disclosure will be described with reference to the attached drawings.

An imaging system according to an embodiment of the present disclosure includes an imaging apparatus and a reconstruction apparatus. With the technique of compressed sensing, the imaging apparatus performs imaging by selectively adding electric charge signals (analog signals) obtained from a plurality of pixels and compresses addition data to reduce the amount of transmission data. The reconstruction apparatus generates an image by using information for controlling selective addition (multiple sampling information which will be described below) and the compressed addition data generated by the imaging apparatus. This processing may be referred to as "to decompress an image" or "to reconstruct an image" in this specification.

In the description given below, "to selectively add" means to selectively add, to an electric charge signal of a pixel at a certain position, an electric charge signal of a pixel at another position having a certain relationship with the certain position and thereby generate a new signal. Selective addition processing means processing of selectively adding signals. The selective addition processing is performed on analog electric charge signals, and signals obtained thereby are also analog electric charge signals. The details of the selective addition processing according to this embodiment will be described below.

Hereinafter, a description will be given of apparatuses included in the imaging system and components of the apparatuses. Then, a description will be given on the basis of specific examples and a description will be given of the details of processing performed by the system and the individual apparatuses.

FIG. 1 illustrates the configuration of an imaging system 10 according to an embodiment of the present disclosure. The imaging system 10 includes an imaging apparatus 20 and a reconstruction apparatus 30. The imaging apparatus 20 compresses and codes an image signal obtained through image capturing and outputs a resulting signal. The reconstruction apparatus 30 decodes and decompresses an image by using the compressed and coded image signal received from the imaging apparatus 20.

The imaging apparatus 20 includes a photoelectric converter 101, an electric charge holder 102, a coding apparatus 1, and a compressing apparatus 2.

The photoelectric converter 101 converts light signals generated from light received by three or more pixels into electric charge signals, each of the electric charge signals corresponding to one of the pixels.

For example, the photoelectric converter 101 includes a light receiving element group and a photoelectric converting element. The light receiving element group includes a plurality of (three or more) pixels and outputs electric signals (light signals) each corresponding to an amount of light received by the corresponding pixel. The photoelectric converting element converts the light signals into electric signals.

Alternatively, the photoelectric converter 101 does not necessarily include the light receiving element group. The photoelectric converter 101 may at least include a photoelectric converting element that receives light signals output from another device, such as an external light receiving element group, and converts the light signals into electric signals.

The electric charge holder 102 stores the electric signals obtained by the photoelectric converter 101 for a certain time period and holds them as electric charge signals.

The photoelectric converter 101 including the light receiving element group and the electric charge holder 102 may be embodied as a so-called image sensor. Hereinafter, a description will be given under the assumption that the photoelectric converter 101 includes a plurality of pixels.

The coding apparatus 1 includes multiple sampling information setter 103, an analog selective adder 104, and an analog-to-digital converter (ADC) 105.

The multiple sampling information setter 103 holds a plurality of analog addition patterns. Each analog addition pattern is a rule for adding pieces of electric charge information corresponding to positions of a certain plurality of pixels among three or more pixels. Each analog addition pattern is information for controlling selective addition of electric charge signals (multiple sampling information). The multiple sampling information setter 103 sets multiple sampling information while changing, spatially and/or temporally, the pattern of pixels for which electric charge signals are added.

The analog selective adder 104 receives information about the plurality of analog addition patterns from the multiple sampling information setter 103. With use of the information, the analog selective adder 104 performs selective addition processing on electric charge signals (analog signals) of a plurality of pixels to generate a plurality of added electric charge signals (analog signals).

The ADC 105 converts the plurality of added electric charge signals (analog signals) into digital signals and outputs the digital signals. In this specification, this conversion processing may be called "AD conversion".

The compressing apparatus 2 compresses digital data that is obtained by performing selective addition processing on an image generated through imaging in the coding apparatus 1, and transmits the compressed digital data. The compressing apparatus 2 includes an addition data compressor 106 and a first communicator 107.

The addition data compressor 106 compresses the digital signals obtained through conversion performed by the ADC 105. More specifically, the addition data compressor 106 compresses the digital signals by using information representing the number of pixels for which pieces of electric charge information are added in the plurality of analog addition patterns, and thereby generates compressed digital signals. Alternatively, the addition data compressor 106 compresses the digital signals by using an addition result of pieces of electric charge information with a weight in the plurality of analog addition patterns, and thereby generates compressed digital signals. Both of the processing operations will be described below in detail.

The first communicator 107 outputs two types of information by using a predetermined transmission format which will be described below. The two types of information include multiple sampling information set by the multiple sampling information setter 103 and digital data compressed by the addition data compressor 106. The outputting may be performed in a wired or wireless manner.

The reconstruction apparatus 30 includes a second communicator 108 and an image reconstructor 109.

The second communicator 108 receives multiple sampling information and compressed digital data from the outside by using the predetermined transmission format. The reception may be performed in a wired or wireless manner. In this embodiment, communication is performed between the first communicator 107 of the compressing apparatus 2 and the second communicator 108 of the reconstruction apparatus 30, and thus a common transmission format is used therebetween.

The image reconstructor 109 reconstructs a captured image on the basis of the compressed digital data by using the multiple sampling information.

Figure 2:
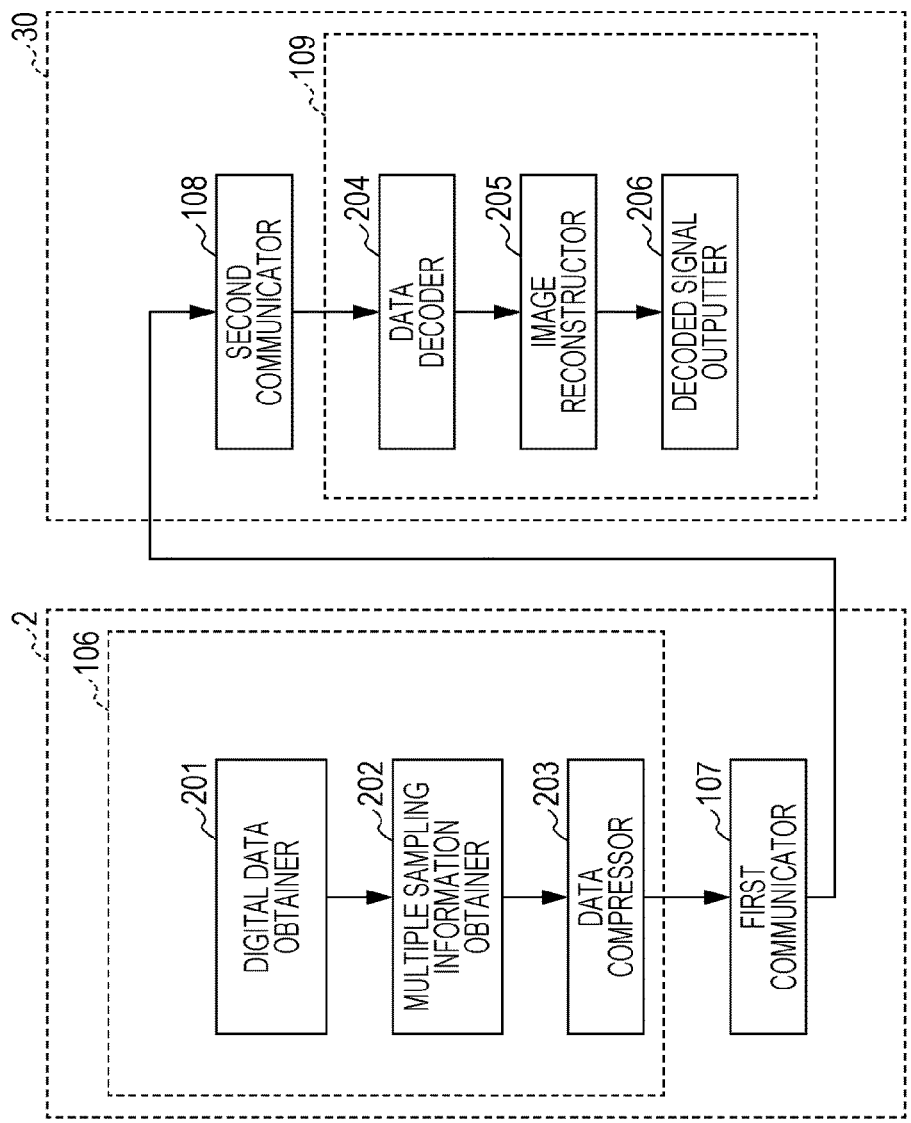
FIG. 2 is a diagram illustrating a more detailed configuration of an addition data compressor of a compressing apparatus and an image reconstructor of a reconstruction apparatus.

FIG. 2 illustrates a more detailed configuration of the addition data compressor 106 of the compressing apparatus 2 and the image reconstructor 109 of the reconstruction apparatus 30. Hereinafter, a description will be given mainly of the addition data compressor 106 and the image reconstructor 109.

The addition data compressor 106 includes a digital data obtainer 201, an multiple sampling information obtainer 202, and a data compressor 203.

The digital data obtainer 201 obtains digital data. The digital data is data that is obtained by converting, with the ADC 105, an image generated through imaging performed by the analog selective adder 104.

The multiple sampling information obtainer 202 obtains the multiple sampling information that has been set by the multiple sampling information setter 103 and that has been used in selective addition processing.

The data compressor 203 selects a digital data compression method for each block, which is the unit of performing compression, and compresses the data of each block by using the selected compression method. This compression processing is also called coding processing. The details of this processing will be described below with reference to FIG. 14 and so forth.

The compressed data is transmitted to the second communicator 108 of the reconstruction apparatus 30 via the first communicator 107 and is received by the image reconstructor 109.

The image reconstructor 109 includes a data decoder 204, an image reconstructor 205, and a decoded signal outputter 206.

The data decoder 204 performs inverse processing of the data compressor 203 to decode the coded data of each block.

The image reconstructor 205 reconstructs an image by using the decoded addition data and multiple sampling information to create a reconstruction image.

The decoded signal outputter 206 outputs the reconstruction image.

Hereinafter, a description will be given of processing that is performed by using the imaging system 10 having the above-described configuration.

The imaging apparatus 20 of the imaging system 10 according to an embodiment of the present disclosure compresses an image signal before AD conversion by using the compressed sensing method so as to reduce the amount of information, and also compresses AD-converted digital data by using multiple sampling information. More specifically, the imaging apparatus 20 performs selective addition processing while changing multiple sampling information spatially and/or temporally, and performs compression processing by using the multiple sampling information. With use of the multiple sampling information, compression processing can be performed more efficiently. The reconstruction apparatus 30 of the imaging system 10 reconstructs an image on the basis of the compressed digital data by using the multiple sampling information used for the compression.

Hereinafter, coding processing will be described.

Figure 3:
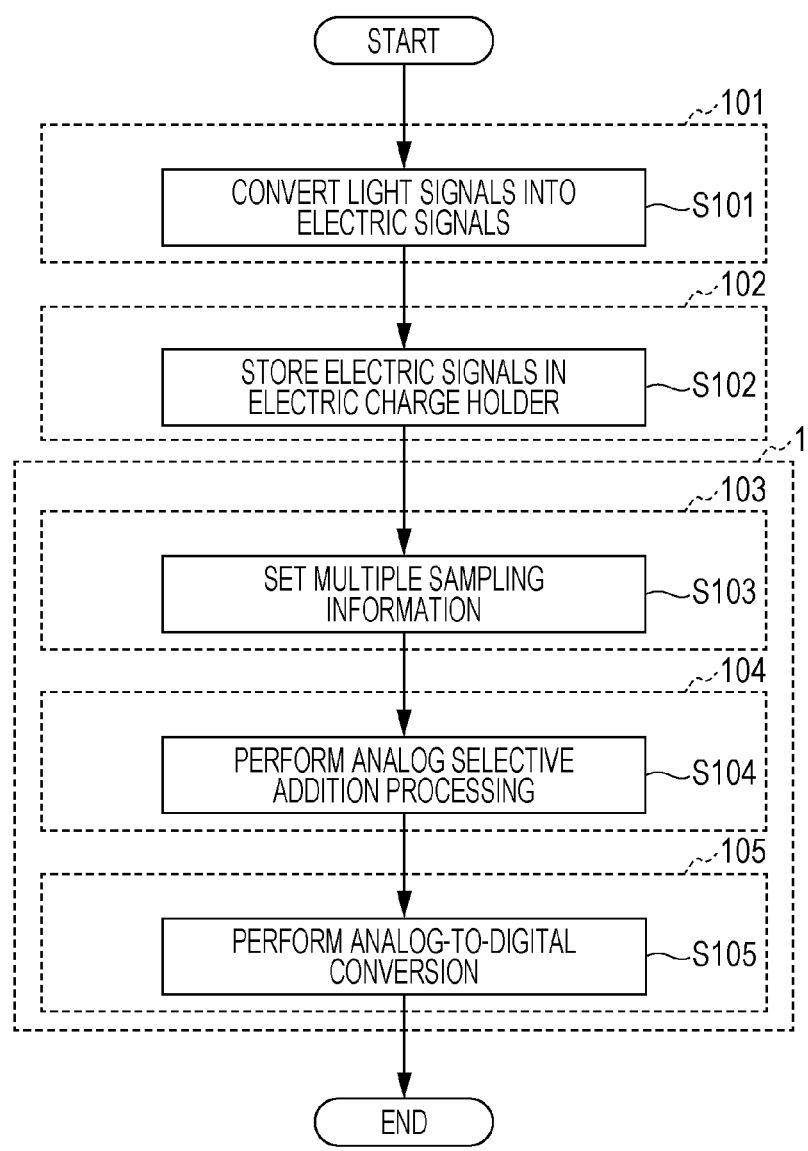
FIG. 3 is a flowchart illustrating a procedure of part of processing performed by an imaging apparatus according to an exemplary embodiment of the present disclosure.

FIG. 3 is a flowchart illustrating a procedure of part of processing performed by the imaging apparatus 20 according to this embodiment. In the flowcharts of the drawings of the present application including FIG. 3, reference numerals denoting the components that perform individual steps are provided together with blocks defined by broken lines.

The photoelectric converter 101 includes a plurality of pixels, each of which converts received light into an electric signal in accordance with the amount of light (step S101). The plurality of pixels are constituted by arranging, for example, photoelectric converting elements such as photodiodes in a two-dimensional manner.

The electric charge holder 102 stores the electric signals of all the pixels obtained by the photoelectric converter 101 for a certain time period and holds them as electric charge signals (step S102). For this purpose, memories for holding the electric charge signals may be provided for the individual pixels.

Here, "all the pixels" may be literally all the pixels, or may be pixels except some pixels. The latter will be described in more detail. In the image sensor constituting the photoelectric converter 101 and the electric charge holder 102, it is often the case that electric charges of pixels at the left end and/or the right end are not read out and are processed as a blank (0). Such pixels from which electric charges are not read out may be excluded and the residual pixels from which electric charges are read out may be called "all the pixels".

Next, the processing proceeds to steps performed by the coding apparatus 1. The multiple sampling information setter 103 sets multiple sampling information so that selective addition processing is performed by the analog selective adder 104 and the ADC 105 (step S103).

The multiple sampling information is information for specifying the details of the processing performed by the analog selective adder 104 and the ADC 105. Specifically, the multiple sampling information includes the positions of pixels used for addition in original electric charge signals regarding the individual signal values of new output signals obtained through selective addition processing, gain information for pixels representing the gain to be applied for addition, and order information representing the order in which added output signals are to be transmitted. The details will be described below.

The analog selective adder 104 performs analog selective addition processing on the electric charge signals of all the pixels held by the electric charge holder 102 on the basis of the multiple sampling information set by the multiple sampling information setter 103, and thereby generates and outputs new signals (step S104).

The ADC 105 convers the signals generated by the analog selective adder 104 into digital signals (step S105). This processing may be performed by using the $\Delta\Sigma$-type ADC described in Y. Oike and A. E. Gamal, "A 256×256 CMOS Image Sensor with $\Delta\Sigma$-Based Single-Shot Compressed Sensing", IEEE International Solid-State Circuits Conference (ISSCC) Dig. of Tech. Papers, pp. 386-387, 2012, or by using a widely used pipeline-type or column-type ADC.

With the selective addition processing performed by the analog selective adder 104, image information can be compressed and the amount of signals to be transmitted to the ADC 105, that is, the amount of signals to be processed by the ADC 105, can be reduced. Selective addition processing, compression processing, and reconstruction processing have a great influence on the quality of an image that is finally output. Thus, how to perform these processing operations is important.

In the analog selective addition processing, all the pixels are grouped into some blocks, the sampling pattern (multiple sampling information) for analog selective addition processing performed on the pixels in a certain block is set so as to be different spatially and/or temporally, and the electric charge signals in a plurality of pixels held by the electric charge holder 102 are added in accordance with the multiple sampling information. "The sampling pattern is spatially different" means that the period of repetition of the sampling pattern is long, or that a different period pattern (sampling pattern) is used for each pixel position. "The sampling pattern is temporally different" means that the sampling pattern for each pixel is different depending on a light receiving time.

With this configuration, the imaging apparatus 20 is capable of performing imaging while changing the multiple sampling information spatially and/or temporally, compressing image data by using the multiple sampling information, and transmitting the compressed image data. Accordingly, the imaging apparatus 20 is capable of reducing transmission data, with a high quality image being decompressed.

Now, a description will be given of the above-mentioned selective addition processing, data compression processing, and image reconstruction processing. To simplify the description, a specific example of processing in which eight output signals are sampled for 4×4=16 pixels will be described.

Specific Example

Figure 4:
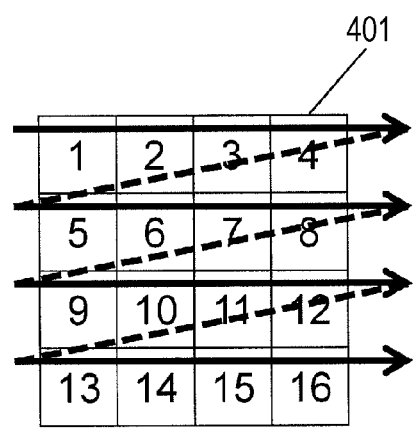
FIG. 4 is a schematic diagram illustrating an arrangement of 4×4=16 pixels according to an exemplary embodiment of the present disclosure.

FIG. 4 is a schematic diagram illustrating an arrangement of 4×4=16 pixels in an example in this specification. In FIG. 4, pixel numbers are assigned to the individual 4×4 pixels. That is, for the 4×4 pixels, pixel numbers "1", "2", "3", and "4" are assigned in the right direction from the pixel at the upper-left corner, pixel numbers "5", "6" . . . are assigned from the left end pixel in the next row, and a pixel number "16" is assigned to the pixel at the lower-right corner. For example, a pixel 401 is a pixel having a pixel number "4".

FIGS. 5A to 5H are schematic diagrams for describing selective addition processing. The selective addition processing is performed by the analog selective adder 104 on the basis of multiple sampling information.

FIGS. 5A to 5H illustrate the pixels for which electric charge signals are added to obtain each of eight output signals in a sampling pattern 1 which will be described below. That is, the individual pixels with a number illustrated in each of FIGS. 5A to 5H are pixels used for selective addition processing. In this specification, a pixel group used for selective addition processing illustrated in each of FIGS. 5A to 5H is called "readout pixel group". FIGS. 5A to 5H illustrate readout pixel groups 402 to 409 to which numbers 1 to 8 are respectively assigned.

Likewise, FIGS. 6A to 6H illustrate readout pixel groups 410 to 417 in eight output signals in a sampling pattern 2, and FIGS. 7A to 7H illustrate readout pixel groups 418 to 425 in eight output signals in a sampling pattern 3.

Figure 5D:
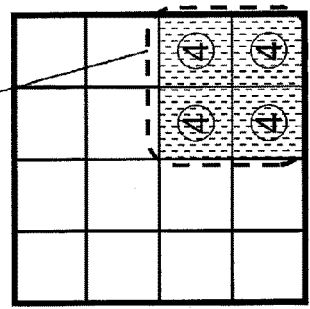
FIG. 5D is a schematic diagram for describing the selective addition processing.
Figure 5C:
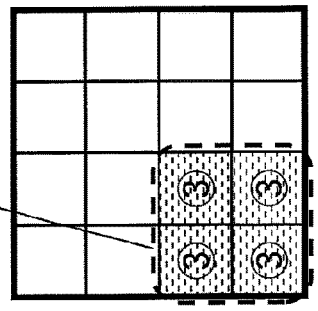
FIG. 5C is a schematic diagram for describing the selective addition processing.
Figure 5B:
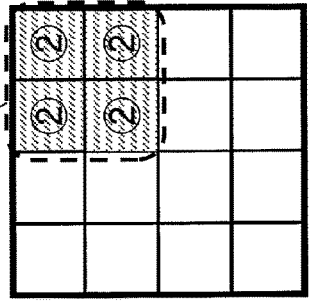
FIG. 5B is a schematic diagram for describing the selective addition processing.
Figure 5A:
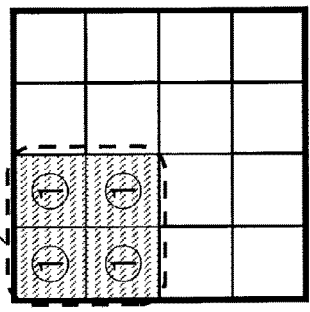
FIG. 5A is a schematic diagram for describing selective addition processing.
Figure 5H:
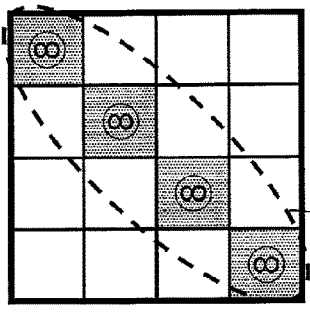
FIG. 5H is a schematic diagram for describing the selective addition processing.
Figure 5G:
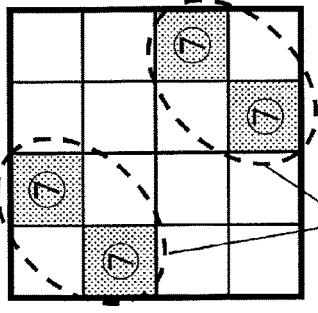
FIG. 5G is a schematic diagram for describing the selective addition processing.
Figure 5F:
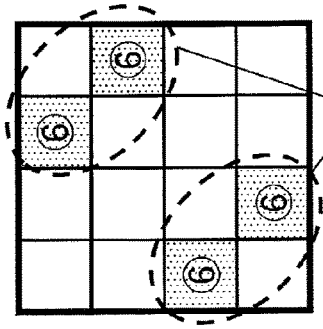
FIG. 5F is a schematic diagram for describing the selective addition processing.
Figure 5E:
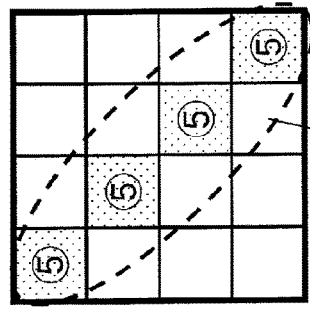
FIG. 5E is a schematic diagram for describing the selective addition processing.
Figure 6D:
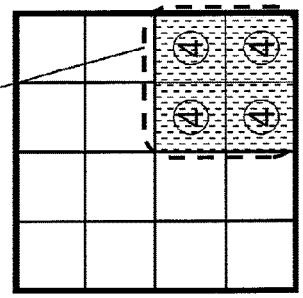
FIG. 6D is a diagram illustrating a pixel group from which electric charge signals are read out to generate a fourth output signal in the second sampling pattern.
Figure 6C:
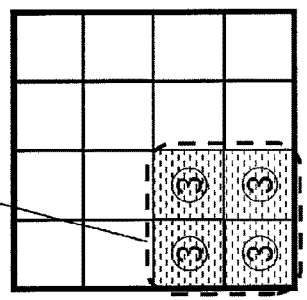
FIG. 6C is a diagram illustrating a pixel group from which electric charge signals are read out to generate a third output signal in the second sampling pattern.
Figure 6B:
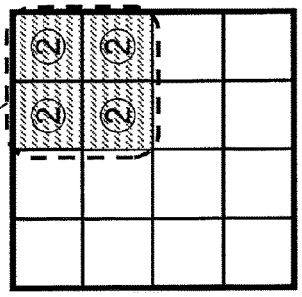
FIG. 6B is a diagram illustrating a pixel group from which electric charge signals are read out to generate a second output signal in the second sampling pattern.
Figure 6A:
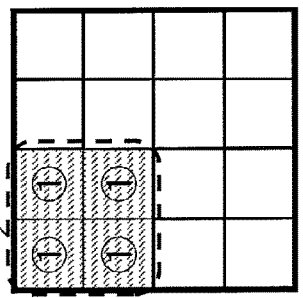
FIG. 6A is a diagram illustrating a pixel group from which electric charge signals are read out to generate a first output signal in a second sampling pattern.
Figure 6H:
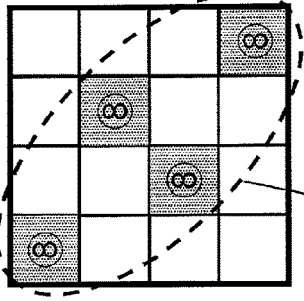
FIG. 6H is a diagram illustrating a pixel group from which electric charge signals are read out to generate an eighth output signal in the second sampling pattern.
Figure 6G:
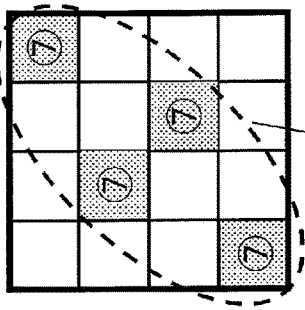
FIG. 6G is a diagram illustrating a pixel group from which electric charge signals are read out to generate a seventh output signal in the second sampling pattern.
Figure 6F:
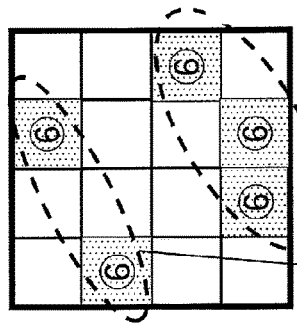
FIG. 6F is a diagram illustrating a pixel group from which electric charge signals are read out to generate a sixth output signal in the second sampling pattern.
Figure 6E:
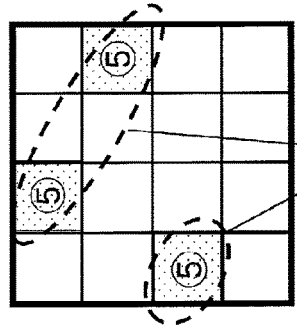
FIG. 6E is a diagram illustrating a pixel group from which electric charge signals are read out to generate a fifth output signal in the second sampling pattern.
Figure 7D:
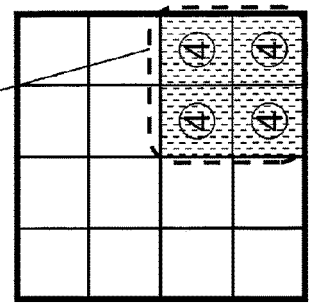
FIG. 7D is a diagram illustrating a pixel group from which electric charge signals are read out to generate a fourth output signal in the third sampling pattern.
Figure 7C:
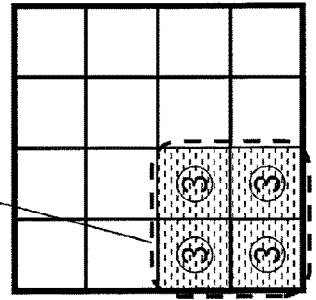
FIG. 7C is a diagram illustrating a pixel group from which electric charge signals are read out to generate a third output signal in the third sampling pattern.
Figure 7B:
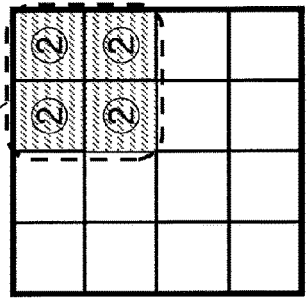
FIG. 7B is a diagram illustrating a pixel group from which electric charge signals are read out to generate a second output signal in the third sampling pattern.
Figure 7A:
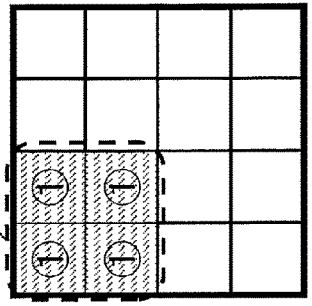
FIG. 7A is a diagram illustrating a pixel group from which electric charge signals are read out to generate a first output signal in a third sampling pattern.
Figure 7H:
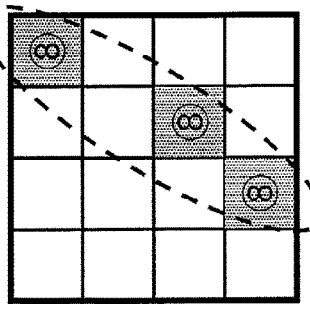
FIG. 7H is a diagram illustrating a pixel group from which electric charge signals are read out to generate an eighth output signal in the third sampling pattern.
Figure 7G:
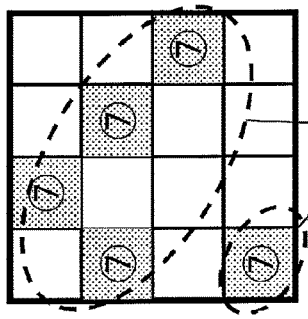
FIG. 7G is a diagram illustrating a pixel group from which electric charge signals are read out to generate a seventh output signal in the third sampling pattern.
Figure 7F:
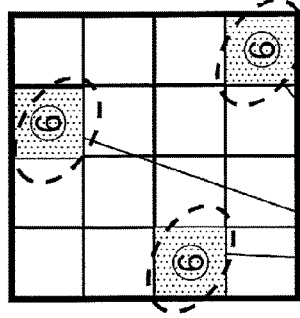
FIG. 7F is a diagram illustrating a pixel group from which electric charge signals are read out to generate a sixth output signal in the third sampling pattern.
Figure 7E:
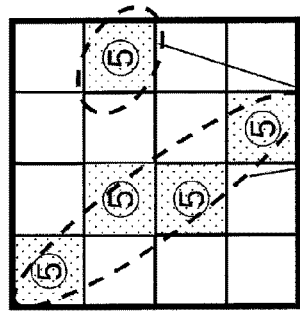
FIG. 7E is a diagram illustrating a pixel group from which electric charge signals are read out to generate a fifth output signal in the third sampling pattern.

In FIG. 5A, electric charge signals of pixel numbers 1, 2, 5, and 6 are read out, addition processing is performed on the electric charge signals of the four pixels, and thereby a first output signal of the sampling pattern 1 is generated. Likewise, in FIG. 5B, electric charge signals of pixel numbers 3, 4, 7, and 8 are read out, addition processing is performed on the electric charge signals of the four pixels, and thereby a second output signal of the sampling pattern 1 is generated. In FIG. 5C, electric charge signals of pixel numbers 9, 10, 13, and 14 are read out, addition processing is performed on the electric charge signals of the four pixels, and thereby a third output signal of the sampling pattern 1 is generated. In FIG. 5D, electric charge signals of pixel numbers 11, 12, 15, and 16 are read out, addition processing is performed on the electric charge signals of the four pixels, and thereby a fourth output signal of the sampling pattern 1 is generated. Also in FIGS. 5E to 5H, a fifth output signal of the sampling pattern 1 is generated from the electric charge signals of pixel numbers 1, 6, 11, and 16, a sixth output signal of the sampling pattern 1 is generated from the electric charge signals of pixel numbers 3, 8, 9, and 14, a seventh output signal of the sampling pattern 1 is generated from the electric charge signals of pixel numbers 2, 5, 12, and 15, and an eighth output signal of the sampling pattern 1 is generated from the electric charge signals of pixel numbers 4, 7, 10, and 13.

In this way, the electric charge signals of 4×4=16 pixels are compressed to eight output signals. Accordingly, the operation speed of the ADC 105 can be reduced, and thus an image can be decompressed while realizing lower power consumption, a higher SN ratio, and a reduced communication band.

The above-described multiple sampling information is expressed as data that is coded in the order of pixel number illustrated in FIG. 4, regarding a pixel sampled for addition as "1" and a pixel not sampled as "0". The details are as follows.

First output signal: "1100 1100 0000 0000"
Second output signal: "0011 0011 0000 0000"
Third output signal: "0000 0000 1100 1100"
Fourth output signal: "0000 0000 0011 0011"
Fifth output signal: "1000 0100 0010 0001"
Sixth output signal: "0010 0001 1000 0100"
Seventh output signal: "0100 1000 0001 0010"
Eighth output signal: "0001 0010 0100 1000"

These are coupled together to obtain multiple sampling information in the sampling pattern 1 as follows.
"1100 1100 0000 0000 0011 0011 0000 0000 0000 0000 1100 1100 0000 0000 0011 0011 1000 0100 0010 0001 0010 0001 1000 0100 0100 1000 0001 0010 0001 0010 0100 1000"

In this specification, the above-given numeral sequence is called "coded data of multiple sampling information" or simply "coded data". The format of the multiple sampling information is not limited to that described here. Any format may be used as long as the positions of pixels sampled for addition are recognizable.

Likewise, referring to FIGS. 6A to 6H, the coded data in the sampling pattern 2 is as follows.
"1100 1100 0000 0000 0011 0011 0000 0000 0000 0000 1100 1100 0000 0000 0011 0011 0100 0010 1000 0000 0010 1000 0001 0110 0001 0100 0010 1000 1000 0010 0100 0001"

Referring to FIGS. 7A to 7H, the coded data in the sampling pattern 3 is as follows.
"1100 1100 0000 0000 0011 0011 0000 0000 0000 0000 1100 1100 0000 0000 0011 0011 1000 0101 0100 0010 0010 0000 1000 0001 0100 1010 0001 1000 0001 0000 0010 0000"

FIGS. 8 and 9 are schematic diagrams illustrating an example of multiple sampling information tables, which is an example of a method for expressing the coded data.

The coded data of multiple sampling information corresponding to the sampling pattern 1 illustrated in FIG. 8 is the data corresponding to the selective addition processing illustrated in FIGS. 5A to 5H.

The coded data of multiple sampling information corresponding to the sampling pattern 2 illustrated in FIG. 8 is the data corresponding to the selective addition processing illustrated in FIGS. 6A to 6H.

The coded data of multiple sampling information corresponding to the sampling pattern 3 illustrated in FIG. 9 is the data corresponding to the selective addition processing illustrated in FIGS. 7A to 7H.

In this way, with one pixel being read out a plurality of times and addition processing being performed a plurality of times, the dynamic range of an output signal can be increased and noise can be reduced. Such selective addition processing is described in, for example, Y. Oike and A. E. Gamal, "A 256×256 CMOS Image Sensor with ΔΣ-Based Single-Shot Compressed Sensing", IEEE International Solid-State Circuits Conference (ISSCC) Dig. of Tech. Papers, pp. 386-387, 2012.

Further, in the imaging system 10 according to this embodiment, selective additional processing operations that are different temporally and spatially are performed. Thus, the addition data compressor 106 divides an imaging device 11 into a plurality of blocks, and different selective addition processing operations are performed on electric charge signals obtained in the individual blocks. Here, multiple sampling information for specifying selective addition processing to be performed on each block is called a multiple sampling pattern.

FIG. 10A schematically illustrates a sampling pattern at time t=t1, FIG. 10B schematically illustrates a sampling pattern at time t=t2, and FIG. 10C schematically illustrates a sampling pattern at time t=t3. Symbols x and y represent indexes of a block number. That is, the upper left block is indicated by (x, y)=(1, 1). Each block is a group of 4×4 pixels. Now, a description will be given of a block 301 indicated by (x, y)=(5, 6) as an example. The number "5" at the center of the block 301 represents the number of the multiple sampling pattern. For example, regarding the electric charge signals of the pixels constituting the block 301, selective addition processing is performed by using a sampling pattern 5 at time t=t1. At time t=t2, selective addition processing is performed by using a sampling pattern 6. At time t=t3, selective addition processing is performed by using a sampling pattern 1. Although the pieces of coded data of multiple sampling information corresponding to sampling patterns 4 to 16 are not described, $Di \neq Dj$ ($i \neq j$, i and j are natural numbers from 1 to 16) is satisfied when the coded data of multiple sampling information corresponding to a sampling pattern n (n is a natural number from 1 to 16) is represented by $Dn$. Also, in a case where $Dn$=(dn1 dn2 dn3 dn4 dn5 dn6 dn7 dn8 dn9 dn10 dn11 dn12 dn13 dn14 dn15 dn16 dn17 dn18 dn19 dn20 dn21 dn22 dn23 dn24 dn25 dn26 dn27 dn28 dn29 dn30 dn31 dn32 dn33 dn34 dn35 dn36 dn37 dn38 dn39 dn40 dn41 dn42 dn43 dn44 dn45 dn46 dn47 dn48 dn49 dn50 dn51 dn52 dn53 dn54 dn55 dn56 dn57 dn58 dn59 dn60 dn61 dn62 dn63 dn64 dn65 dn66 dn67 dn68 dn69 dn70 dn71 dn72 dn73 dn74 dn75 dn76 dn77 dn78 dn79 dn80 dn81 dn82 dn83 dn84 dn85 dn86 dn87 dn88 dn89 dn90 dn91 dn92 dn93 dn94 dn95 dn96 dn97 dn98 dn99 dn100 dn101 dn102 dn103 dn104 dn105 dn106 dn107 dn108 dn109 dn110 dn111 dn112 dn113 dn114 dn115 dn116 dn117 dn118 dn119 dn120 dn121 dn122 dn123 dn124 dn125 dn126 dn127 dn128),
dn1=dn2=1, dn3=dn4=0,
dn5=dn6=1, dn7=dn8=0,
dn9=dn10=dn11=dn12=0,
dn13=dn14=dn15=dn16=0,
dn17=dn18=0, dn19=dn20=1,
dn21=dn22=0, dn23=dn24=1,
dn25=dn26=dn27=dn28=0,
dn29=dn30=dn31=dn32=0,
dn33=dn34=dn35=dn36=0,
dn37=dn38=dn39=dn40=0,
dn41=dn42=1, dn43=dn44=0,
dn45=dn46=1, dn47=dn48=0,
dn49=dn50=dn51=dn52=0,
dn53=dn54=dn55=dn56=0,
dn57=dn58=0, dn59=dn60=1, and
dn61=dn62=0, dn63=dn64=1 may be satisfied.

Likewise, at time t=t1, selective addition processing is performed by using the sampling pattern 1 in the (1, 1) block. Also, selective addition processing is performed by using the sampling pattern 2 in the (2, 1) block, and selective addition processing is performed by using the sampling pattern 3 in the (3, 1) block.

Here, 4×4=16 patterns, each for 4×4 pixels, are used, and thus the period of the sampling pattern used in each block is calculated as 16×16=256. In the case of ordinary single-plate imaging, Bayer pattern is widely used as a color filter array. In this pattern, the same arrangement of red, green, and blue is provided in units of 2×2 pixels, and thus the arrangement has a 2×2 period. That is, in this embodiment, the 16×16 period for performing sampling is very large compared to the 2×2 period of an imaging apparatus according to the related art. Further, since the sampling pattern is temporally changed, the addition method is different in each frame even in the case of one pixel. Therefore, selective addition processing operations that are different temporally and/or spatially can be performed.

The inventors apply the following conditions to the selective addition processing performed by the coding apparatus 1 according to this embodiment.

(1) Selective addition processing operations related to first to fourth output signals are performed in a fixed manner regardless of a sampling pattern. Neighbor pixels are sampled at the same time so that the readout pixel group becomes a low-resolution image of a reconstruction image.

(2) Selective addition processing operations related to fifth to eighth output signals are different in individual sampling patterns and thus are different spatially and/or temporally.

FIGS. 11A, 11B, 12A, 12B, 13A, and 13B are schematic diagrams for describing the two conditions of selective addition processing. In these figures, the same components as those illustrated in FIGS. 5A to 5H, FIGS. 6A to 6H, and FIGS. 7A to 7H are denoted by the same reference numerals, and the description thereof is omitted.

Figure 11A:
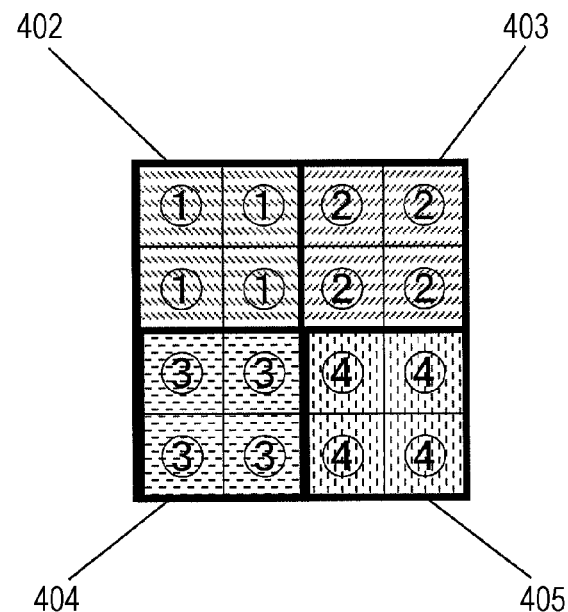
FIG. 11A is a diagram illustrating first to fourth readout pixel groups from which electric charge signals are read out in sampling processing using a first sampling pattern.
Figure 11B:
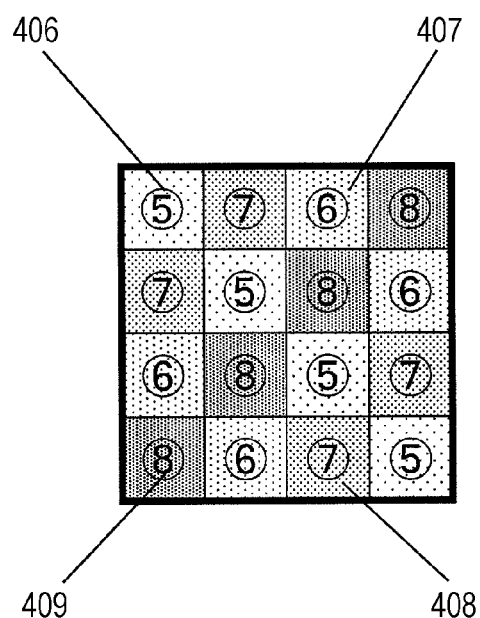
FIG. 11B is a diagram illustrating fifth to eighth readout pixel groups from which electric charge signals are read out in sampling processing using the first sampling pattern.
Figure 12A:
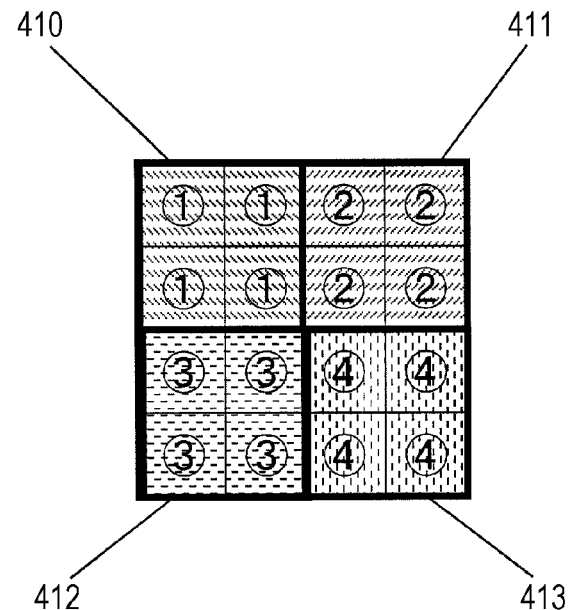
FIG. 12A is a diagram illustrating first to fourth readout pixel groups from which electric charge signals are read out in sampling processing using the second sampling pattern.
Figure 12B:
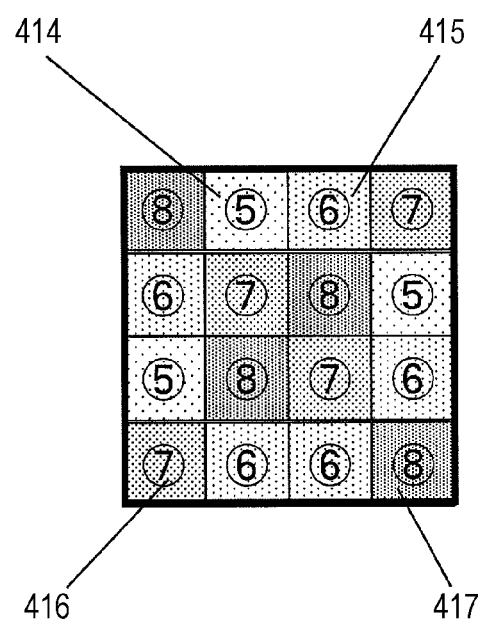
FIG. 12B is a diagram illustrating fifth to eighth readout pixel groups from which electric charge signals are read out in sampling processing using the second sampling pattern.
Figure 13A:
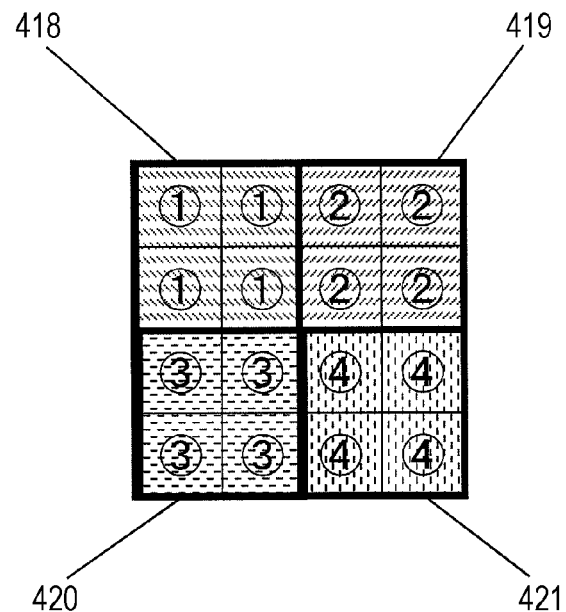
FIG. 13A is a diagram illustrating first to fourth readout pixel groups from which electric charge signals are read out in sampling processing using the third sampling pattern.
Figure 13B:
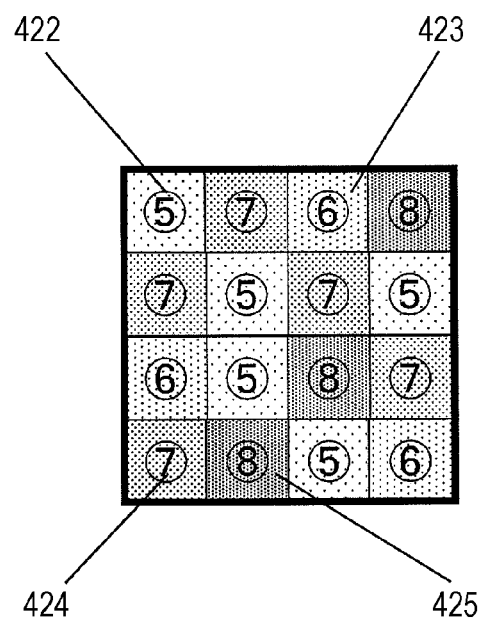
FIG. 13B is a diagram illustrating fifth to eighth readout pixel groups from which electric charge signals are read out in sampling processing using the third sampling pattern.

Among FIGS. 11A, 11B, 12A, 12B, 13A, and 13B, FIGS. 11A, 12A, and 13A illustrate the first to fourth readout pixel groups 402 to 405, 410 to 413, and 418 to 421 that are read out in sampling processing operations using the sampling patterns 1 to 3. FIGS. 11B, 12B, and 13B illustrate the fifth to eighth readout pixel groups 406 to 409, 414 to 417, and 422 to 425 that are read out in sampling processing operations using the sampling patterns 1 to 3. Reference numerals are attached to some of the pixels for the convenience of description.

Regarding the individual output signals based on the first to fourth readout pixel groups 402 to 405, 410 to 413, and 418 to 421, 4×4 pixels are reduced in resolution to 2×2 pixels or equivalent through sampling processing. Further, the sampling pixels are not changed in the sampling patterns 1 to 3. Thus, the imaging system according to this embodiment is capable of displaying a low-resolution image in real time with hardly imposing a processing load by outputting the first to fourth output signals without performing image reconstruction processing thereon.

On the other hand, regarding the individual output signals based on the fifth to eighth readout pixel groups 406 to 409, 414 to 417, and 422 to 425, the positions of sampling pixels constantly change in the sampling patterns 1 to 3. However, all of the 4×4 pixels are sampled once without fail, and the sampling frequency is the same in all the pixels. In this way, with sampling pixels being temporally changed, the quality of an image decompressed by the image reconstructor 109 can be improved (see, for example, S. Sato, Nobori and T. Azuma, "Compressive Sensing Reconstruction Using Local Spatial Similarity among Color Channels", Meeting on Image Recognition and Understanding (MIRU), 2014).

Of course, the analog selective adder 104 may select the positions of pixels for which selective addition is to be performed so that the positions are spatially and temporally random and/or independent as much as possible. Accordingly, degradation of image information due to selective addition processing can be prevented, and the quality of a reconstruction image can be increased. For example, in pp. 43-44 of Toshiyuki Tanaka, "Mathematics of Compressed Sensing", IEICE Fundamentals Review, vol. 4, no. 1, pp. 39-47, 2010, it is discussed that an unknown sparse vector can be correctly estimated from a random matrix and an observation result.

Such random and selective addition processing is implemented by setting in advance addition data that is obtained through random and selective addition as illustrated in FIGS. 8 and 9. In this case, the multiple sampling information setter 103 may change the sampling pattern number to be used for each frame. In order to temporally and spatially change the sampling pattern in an operation of an existing apparatus, a switch for changing the sampling pattern in a software or hardware manner may be provided, and the pixel values to be added may be changed by using the switch. Here, ON and OFF of the switch may be set by using an external signal, and the external signal may be used as multiple sampling information.

Now, a captured image and a signal output through selective addition are expressed in the form of vectors. A captured image vector in which pixel values of a captured image are arranged in the order of pixel number illustrated in FIG. 4 is represented by x, whereas an output signal vector obtained by arranging the first to eighth output signals is represented by y. In this case, the following relation equation (1) is established.

$$y = S \cdot x \quad (1)$$

A matrix S is a sampling matrix. For example, a sampling matrix S, which is an expression of the above-described multiple sampling information regarding the sampling pattern 1 in the form of a matrix, is expressed by the following equation (2).

$$S = \begin{bmatrix} 1 & 1 & 0 & 0 & 1 & 1 & 0 & 0 & 0 & 0 & 0 & 0 & 0 & 0 & 0 & 0 \\ 0 & 0 & 1 & 1 & 0 & 0 & 1 & 1 & 0 & 0 & 0 & 0 & 0 & 0 & 0 & 0 \\ 0 & 0 & 0 & 0 & 0 & 0 & 0 & 0 & 1 & 1 & 0 & 0 & 1 & 1 & 0 & 0 \\ 0 & 0 & 0 & 0 & 0 & 0 & 0 & 0 & 0 & 1 & 1 & 0 & 0 & 1 & 1 \\ 1 & 0 & 0 & 0 & 0 & 1 & 0 & 0 & 0 & 0 & 1 & 0 & 0 & 0 & 0 & 1 \\ 0 & 0 & 1 & 0 & 0 & 0 & 0 & 1 & 1 & 0 & 0 & 0 & 0 & 0 & 1 & 0 \\ 0 & 1 & 0 & 0 & 1 & 0 & 0 & 0 & 0 & 0 & 1 & 0 & 0 & 1 & 0 \\ 0 & 0 & 0 & 1 & 0 & 0 & 1 & 0 & 0 & 1 & 0 & 0 & 1 & 0 & 0 & 0 \end{bmatrix} \quad (2)$$

With the above-described selective addition processing, electric charge signals for sixteen pixels can be compressed into eight output signals.

Likewise, a sampling matrix S, which is an expression of the above-described multiple sampling information regarding the sampling pattern 2 in the form of a matrix, is expressed by the following equation (3).

$$S = \begin{bmatrix} 1 & 1 & 0 & 0 & 1 & 1 & 0 & 0 & 0 & 0 & 0 & 0 & 0 & 0 & 0 & 0 \\ 0 & 0 & 1 & 1 & 0 & 0 & 1 & 1 & 0 & 0 & 0 & 0 & 0 & 0 & 0 & 0 \\ 0 & 0 & 0 & 0 & 0 & 0 & 0 & 0 & 1 & 1 & 0 & 0 & 1 & 1 & 0 & 0 \\ 0 & 0 & 0 & 0 & 0 & 0 & 0 & 0 & 0 & 1 & 1 & 0 & 0 & 1 & 1 \\ 0 & 1 & 0 & 0 & 0 & 0 & 1 & 0 & 1 & 0 & 0 & 0 & 0 & 0 & 0 & 0 \\ 0 & 0 & 1 & 0 & 1 & 0 & 0 & 0 & 0 & 0 & 1 & 0 & 1 & 1 & 0 \\ 0 & 0 & 0 & 1 & 0 & 1 & 0 & 0 & 0 & 0 & 1 & 0 & 1 & 0 & 0 & 0 \\ 1 & 0 & 0 & 0 & 0 & 0 & 1 & 0 & 0 & 1 & 0 & 0 & 0 & 0 & 0 & 1 \end{bmatrix} \quad (3)$$

Next, a description will be given of data compression processing and decoding processing.

Figure 14:
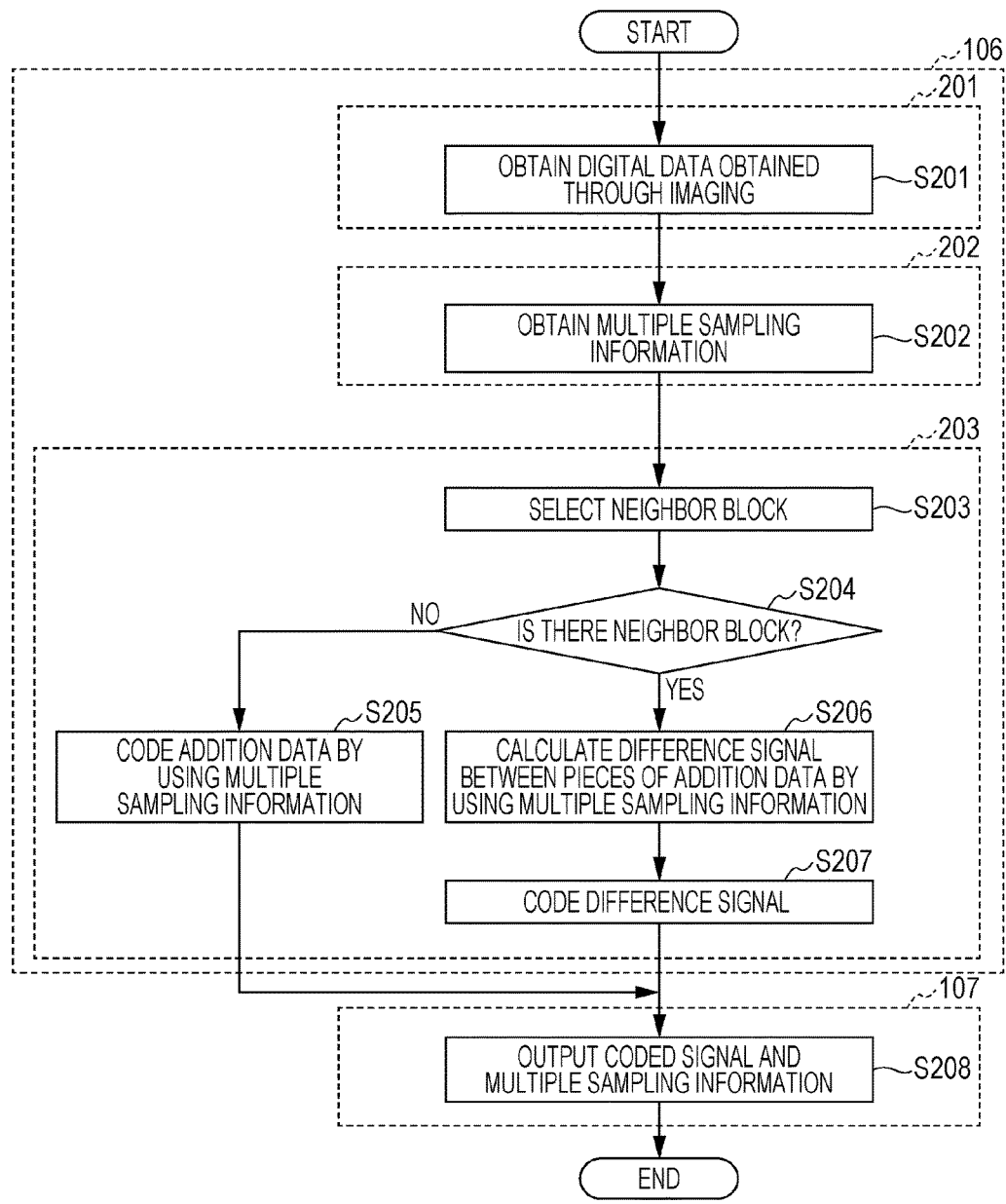
FIG. 14 is a flowchart illustrating a procedure of processing performed by the compressing apparatus illustrated in FIG. 2 according to an exemplary embodiment of the present disclosure.
Figure 15:
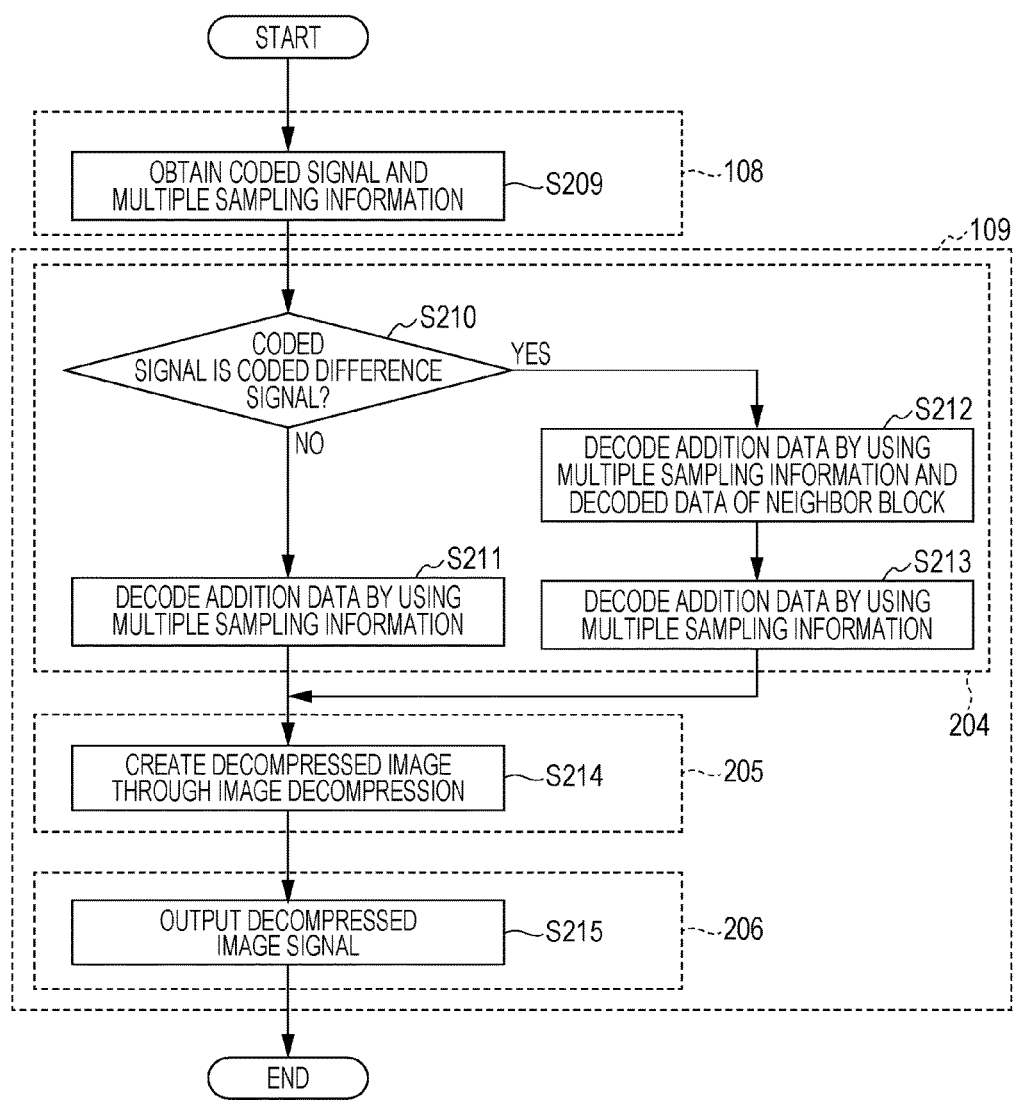
FIG. 15 is a flowchart illustrating a procedure of processing performed by the reconstruction apparatus illustrated in FIG. 2 according to an exemplary embodiment of the present disclosure.

FIG. 14 is a flowchart illustrating a procedure of processing performed by the compressing apparatus 2 (FIG. 2) according to this embodiment. FIG. 15 is a flowchart illustrating a procedure of processing performed by the reconstruction apparatus 30 (FIG. 2) according to this embodiment.

First, the data compression processing will be described.

The digital data obtainer 201 obtains digital data which is generated by converting, with the ADC 105, data generated through imaging performed by the analog selective adder 104 (step S201).

The multiple sampling information obtainer 202 obtains multiple sampling information that has been set by the multiple sampling information setter 103 and that has been used in selective addition processing (step S202).

The data compressor 203 selects a neighbor block in order to select a method for compressing transmission data (step S203). In data compression in image processing according to the related art, a theory in which there is high correlation between pixels or blocks close to each other is used. That is, the data can be compressed by calculating a difference between pixels or blocks close to each other. On the other hand, in the case of performing selective addition processing operations that are different spatially and temporally, individual output signals are generated by adding electric charges of different numbers of pixels as expressed by equation (3), and thus the compression rate is not increased by simply calculating a difference. The data compressor 203 according to this embodiment uses information about a sampling matrix S serving as multiple sampling information to address the issue that electric charges of different numbers of pixels are added, and thereby performs more efficient compression.

Here, blocks are compressed in a raster scan order. Specifically, in FIGS. 10A to 10O, the block of (x, y)=(1, 1) is compressed first, then the block of (2, 1) is compressed, then the block of (3, 1) is compressed, and finally the block of (6, 6) is compressed. In this case, a block on the left of a target block is selected as a neighbor block.

If a neighbor block does not exist (NO in step S204), that is, in the case of compressing a left end block (x=1) of the image, addition data is coded to compress a signal (step S205). In this case, for example, a difference between output signal vector elements may be calculated, and a difference signal obtained through the calculation may be coded by entropy coding or Huffman coding. A difference signal d representing a difference between output signal vectors is calculated by multiplying a correction coefficient calculated by using multiple sampling information as expressed by equation (4).

$$d_1 = l_1 = \frac{1}{\text{Sum}(S(1))} y_1, \quad (4)$$

$$l_i = \frac{1}{\text{Sum}(S(i))} y_i,$$

$$d_i = l_i - l_{i-1},$$

$$i = 2, \ldots, 8.$$

Here, $y_i$ represents the i-th output signal, and Sum (S(i)) represents the sum of the components in the i-th row of the sampling matrix S.

In a case where a component in m rows and n columns of the sampling matrix S is represented by $s_{mn}$, Sum (S(i))=$s_{i1}$+ $s_{i2}$+ . . . +$s_{i16}$ is satisfied. For example, Sum(S(1))=1+1+0+ 0+1+1+0+0+0+0+0+0+0+0+0+0=4.

FIG. 16 illustrates an example of a transmission format for transmitting multiple sampling information and a difference signal d representing a difference between output signal vectors. The multiple sampling information may be described in a header portion 501, and the difference signal d representing the difference between the output signal vectors may be described in a data portion 502. Here, as the multiple sampling information in the header portion 501, multiple sampling pattern group numbers may be described instead of multiple sampling information for all the blocks. FIG. 17 illustrates an example of a transmission format in a case where multiple sampling pattern group numbers are described in the header portion 501.

FIG. 18 is a schematic diagram illustrating an example of multiple sampling pattern group numbers. Here, an multiple sampling pattern group number 1 represents time t=t1 in FIG. 10A, an multiple sampling pattern group number 2 represents time t=t2 in FIG. 10B, and an multiple sampling pattern group number 3 represents time t=t3 in FIG. 10C. In this way, the transmission data can be reduced while making the header portion 501 small.

In the case of transmitting the transmission format by encrypting it, the multiple sampling information in the header portion 501 may be encrypted instead of compressing the entire data. As will be described below, in the decompressing processing according to this embodiment, multiple sampling information is necessary. Further, it is not possible to obtain a high-resolution image by using addition data because it has been subjected to random addition processing. Therefore, the multiple sampling information in the header portion 501 is encrypted without compressing the entire data, and accordingly the transmission data can be encrypted while suppressing an operation load.

On the other hand, if data of the selected neighbor block has already been transmitted (YES in step S204), a difference signal representing a difference from addition data of the selected neighbor block is also calculated (step S206), and a difference signal representing a difference between output signal vectors is coded to compress the signal (step S207). In step S206, the difference signal representing the difference in addition data between blocks is calculated by using, for example, the following equation (5).

$$l_1 = \frac{1}{\text{Sum}(S(1))} y_1 \quad (5)$$

$$d_1 = l_1 - l_{8,l}$$

Here, $I_{-8,1}$ represents the eighth difference signal for the selected neighbor block. It is known that, in a natural image, blocks adjacent to each other are highly correlated. Thus, the compression rate can be increased by performing compression processing by using information about a neighbor block. That is, the above-described eighth difference signal is an example, and any neighbor block may be used.

In step S207, the difference signal d representing the difference between output signal vectors is calculated by using the following equation (6).

$$l_i = \frac{1}{\text{Sum}(S(i))} y_i \quad (6)$$

$$d_i = l_i - l_{i-1}, i = 2, \ldots, 8$$

As described above, the data compressor 203 according to this embodiment is capable of addressing the issue that electric charges of different numbers of pixels are added, by using information about the sampling matrix S serving as multiple sampling information, and accordingly more efficient compression can be performed.

The first communicator 107 transmits the coded signal compressed by the data compressor 203 and the multiple sampling information to the reconstruction apparatus 30 (step S208).

Next, the image reconstruction processing will be described.

The second communicator 108 receives the coded signal and the multiple sampling information transmitted by the first communicator 107 (step S209). The communication is performed via a wireless or wired communication network.

The data decoder 204 determines whether the coded signal is a coded difference signal representing a difference between blocks or coded addition data (step S210). The determination may be performed by determining whether or not the block is at the left end of the image (x=1).

If the block is at the left end of the image, that is, if the coded signal is addition data (NO in step S210), the data decoder 204 decodes addition data y by using the multiple sampling information on the basis of the coded signal I (step S211). This is calculated by using the following equation (7).

$$y_1 = \text{Sum}(S(1)) \cdot d_1,$$

$$l_i = i_{i-1} + d_1,$$

$$y_i = \text{Sum}(S(i)) \cdot l_i,$$

$$i = 2, \ldots, 8. \tag{7}$$

On the other hand, if the coded signal is a coded difference signal representing a difference between blocks (YES in step S210), the data decoder 204 decodes the addition data by using the multiple sampling information and the decoded data of the neighbor block on the basis of the coded signal I (step S212). This is calculated by using the following equation (8).

$$l_1 = d_1 + l_{8,i},$$

$$y_1 = \text{Sum}(S(1)) \cdot l_1. \tag{8}$$

In step S213, the addition data y is decoded by using the multiple sampling information on the basis of the coded signal I (step S213). This is calculated by using the following equation (9).

$$l_i = l_{i-1} + d_i,$$

$$y_i = \text{Sum}(S(i)) \cdot l_i,$$

$$i = 2, \ldots, 8. \tag{9}$$

The image reconstructor 205 creates a reconstruction image by performing image reconstruction by using the decoded addition data and multiple sampling information (step S214).

The data decoder 204 and the image reconstructor 205 are implemented when a central processing unit (CPU), which is not illustrated, executes a computer program. Instead of implementing the data decoder 204 and the image reconstructor 205 through execution of the computer program by the CPU, a signal processing circuit providing the same function may be provided as hardware.

The decoded signal outputter 206 displays the reconstruction image generated by the image reconstructor 205 on a display or stores it in a memory.

The reconstruction processing is performed by using a method in which a repetition structure of an image is extracted by presuming local similarity of the image as prior knowledge and the repetition structure is used as foresight information (see, for example, J. Zhang, D. Zhao, C. Zhao, R. Xiong, S. Ma, and W. Gao, "Compressed Sensing Recovery via Collaborative Sparsity", Proc. of Data Compression Conference, pp. 287-296, 2012). Of course, the method for reconstruction processing is not limited thereto, and another method widely used in compressed sensing according to the related art, such as the Improved Iterative Curvelet Thresholding method (see, for example, J. Ma, "Improved Interactive Curvelet Thresholding for Compressed Sensing and Measurement", IEEE Transactions on Instrumentation and Measurement, vol. 60, no. 1, pp. 126-136, 2011), an affine scaling method (see, for example, Toshihide Ibaraki and Masao Fukushima, "Saitekika no Shuhou", Jouhou Suugaku Kouza, vol. 14 out of a total of 15 volumes, pp. 159-164, Kyoritsu Shuppan Co., Ltd, the first edition published Jul. 20, 1993), or Alternating Direction Method of Multipliers (see, for example, Manya V. Afonso, Jose M. Bioucas-Dias, and Mario A. T. Figueiredo, "Fast Image Recovery Using Variable Splitting and Constrained Optimization" IEEE Transactions on Image Processing, Vol. 19, No. 9, pp. 2345-2356, 2010), may be used.

In the imaging system 10 according to an embodiment of the present disclosure, selective addition processing is performed while spatially and/or temporally changing an multiple sampling pattern, and compression processing is performed in units of pieces of data on which selective addition processing has been performed using the same sampling pattern. The pieces of data on which selective addition processing has been performed using the same sampling pattern are highly correlated, and thus can be compressed more efficiently.

The imaging system described in this specification is not necessarily implemented as an apparatus. For example, a general-purpose processor which is a computer may execute a computer program recorded on a computer-readable recording medium and thereby the above-described operation of the imaging apparatus may be performed. Such a computer program includes a group of instructions that cause the computer to perform the processing operations according to the flowcharts illustrated in FIGS. 14 and 15. The computer program is recorded on a recording medium such as a CD-ROM and is circulated in the market as a product, or is transmitted via an electric communication network such as the Internet.

The addition data compressor 106 may perform compression processing by using an average value of pixel values in a block. Now, this processing will be described. As described above with reference to FIGS. 11A, 11B, 12A, 12B, 13A, and 13B, in the imaging system according to this embodiment, a low-resolution image can be obtained through simple processing. With use of the information, an average value in the block is obtained. That is, a total value of sixteen pixels in the block can be calculated by adding the first to fourth output signals obtained through selective addition processing. An average value in the block can be calculated by dividing the total value by the number of pixels, that is, 16. Here, in a case where the average value in the block is represented by A, the data compressor 203 changes addition data as expressed by the following equation (10).

$$y'_i = y_i - \text{Sum}(S(i)) \cdot A,$$

$$i = 1, \ldots, 8. \tag{10}$$

The symbol y' obtained in this manner has a value approximate to 0. Thus, with use of $y_i'$ instead of $y_i$ in equations (4) to (9), the compression rate can be increased. In this case, the average value A of each block is also transmitted and received by the first communicator 107 and the second communicator 108.

According to the description given above, the analog selective adder 104 performs addition processing on electric charge signals of a plurality of pixels held by the electric charge holder 102 in accordance with multiple sampling information. Alternatively, the analog selective adder 104 may of course perform addition processing by applying a weight as gain. As described above, in compressed sensing, the quality of a reconstruction image can be improved by selecting, spatially and temporally randomly as much as possible, positions of pixels to be sampled. Therefore, with addition processing being performed by applying a weight as gain, the randomness can be increased and the quality of the reconstruction image can be improved. Further, addition of a plurality of pixels increases the dynamic range of data, which is effective to address an issue of an increase in the load of the ADC 105. Such addition processing with weighting may be performed by using the following matrix S expressed by the following equation (11) instead of the sampling matrix S expressed by equation (2).

$$S = \begin{bmatrix} 0.8 & 0.2 & 0 & 0 & 0.5 & 0.1 & 0 & 0 & 0 & 0 & 0 & 0 & 0 & 0 & 0 & 0 \\ 0 & 0 & 0.3 & 0.7 & 0 & 0 & 0.2 & 0.5 & 0 & 0 & 0 & 0 & 0 & 0 & 0 & 0 \\ 0 & 0 & 0 & 0 & 0 & 0 & 0 & 0 & 0.6 & 0.4 & 0 & 0 & 0.5 & 0.7 & 0 & 0 \\ 0 & 0 & 0 & 0 & 0 & 0 & 0 & 0 & 0 & 0 & 0.1 & 0.7 & 0 & 0 & 0.3 & 0.6 \\ 0.3 & 0 & 0 & 0 & 0 & 0.4 & 0 & 0 & 0 & 0 & 0.9 & 0 & 0 & 0 & 0 & 0.5 \\ 0 & 0 & 0.4 & 0 & 0 & 0 & 0 & 0.3 & 0.3 & 0 & 0 & 0 & 0 & 0 & 0.2 & 0 \\ 0 & 1.0 & 0 & 0 & 0.8 & 0 & 0 & 0 & 0 & 0 & 0 & 0.5 & 0 & 0 & 0.5 & 0 \\ 0 & 0 & 0 & 0.3 & 0 & 0 & 0.7 & 0 & 0 & 0.6 & 0 & 0 & 0.4 & 0 & 0 & 0 \end{bmatrix} \quad (11)$$

In the case of performing normalization processing to adjust the dynamic range of data obtained through addition, a weight of ¼ may be applied as gain. In the case of applying gain to selective addition processing in this way, the sampling matrix S may be set as expressed by the following equation (12).

$$S = \begin{bmatrix} 0.25 & 0.25 & 0 & 0 & 0.25 & 0.25 & 0 & 0 & 0 & 0 & 0 & 0 & 0 & 0 & 0 & 0 \\ 0 & 0 & 0.25 & 0.25 & 0 & 0 & 0.25 & 0.25 & 0 & 0 & 0 & 0 & 0 & 0 & 0 & 0 \\ 0 & 0 & 0 & 0 & 0 & 0 & 0 & 0 & 0.25 & 0.25 & 0 & 0 & 0.25 & 0.25 & 0 & 0 \\ 0 & 0 & 0 & 0 & 0 & 0 & 0 & 0 & 0 & 0 & 0.25 & 0.25 & 0 & 0 & 0.25 & 0.25 \\ 0 & 0.25 & 0 & 0 & 0 & 0 & 0.25 & 0 & 0.25 & 0 & 0 & 0 & 0 & 0 & 0 & 0 \\ 0 & 0 & 0.25 & 0 & 0.25 & 0 & 0 & 0 & 0 & 0 & 0 & 0.25 & 0 & 0.25 & 0.25 & 0 \\ 0 & 0 & 0 & 0.25 & 0 & 0.25 & 0 & 0 & 0 & 0 & 0.25 & 0 & 0.25 & 0 & 0 & 0 \\ 0.25 & 0 & 0 & 0 & 0 & 0 & 0.25 & 0 & 0 & 0.25 & 0 & 0 & 0 & 0 & 0 & 0.25 \end{bmatrix} \quad (12)$$

In this way, in a case where the analog selective adder 104 performs addition processing with weighting in accordance with multiple sampling information, the data compressor 203 may perform processing by using equations (4) to (9). Next, modification examples of the above-described imaging system will be described. In the following modification examples, components having the same function and same configuration are denoted by the same reference numerals, and components having a different function and/or configuration are denoted by reference numerals with "a" or "b". The various modification examples described below are applicable to the above-described example of performing addition processing with weighting.

Figure 19:
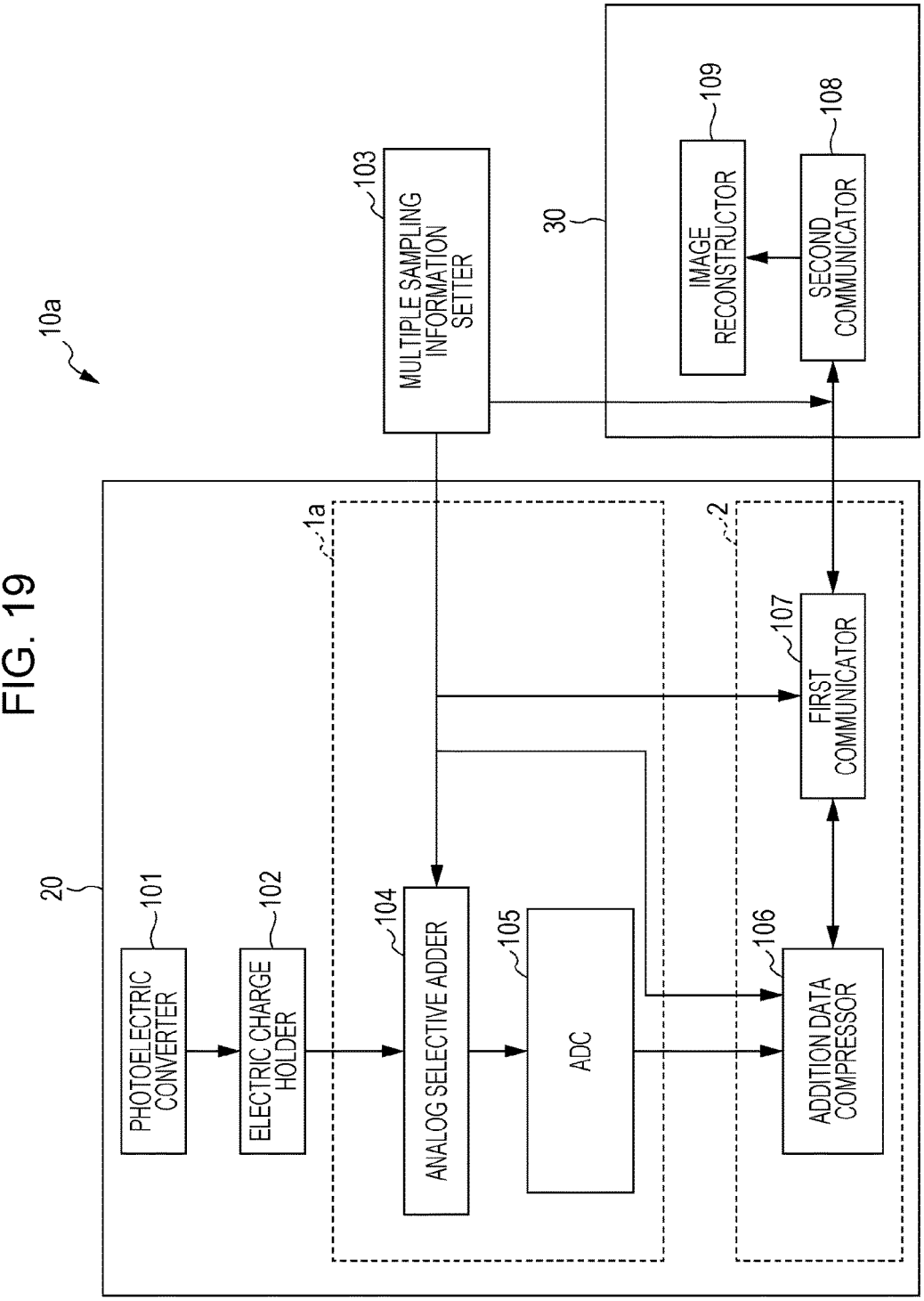
FIG. 19 is a diagram illustrating the configuration of an imaging system according to a first modification example of the imaging system illustrated in FIG. 1.

FIG. 19 illustrates the configuration of an imaging system 10a according to a first modification example of the imaging system 10 (FIG. 1). The imaging system 10a is different from the imaging system 10 in that the multiple sampling information setter 103 is provided outside the imaging apparatus 20. That is, a coding apparatus 1a of the imaging system 10a does not include the multiple sampling information setter 103.

The multiple sampling information setter 103 may be implemented by, for example, an information terminal such as a smartphone or a personal computer (PC) connected in a network.

The multiple sampling information setter 103 transmits multiple sampling information to the analog selective adder 104, the addition data compressor 106, and the image reconstructor 109 of the reconstruction apparatus 30. Since the multiple sampling information is transmitted directly from the multiple sampling information setter 103 to the reconstruction apparatus 30, it is not necessary for the first communicator 107 to transmit the multiple sampling information by storing it in the header portion 501 illustrated in FIG. 16. Other than the point described above, the configuration and operation of the imaging system 10a are the same as those of the imaging system 10 (FIG. 1).

The multiple sampling information is not necessarily transmitted directly from the multiple sampling information setter 103 to the reconstruction apparatus 30. In this case, the first communicator 107 may transmit the multiple sampling information by storing it in the header portion 501 as illustrated in FIG. 16.

Figure 20:
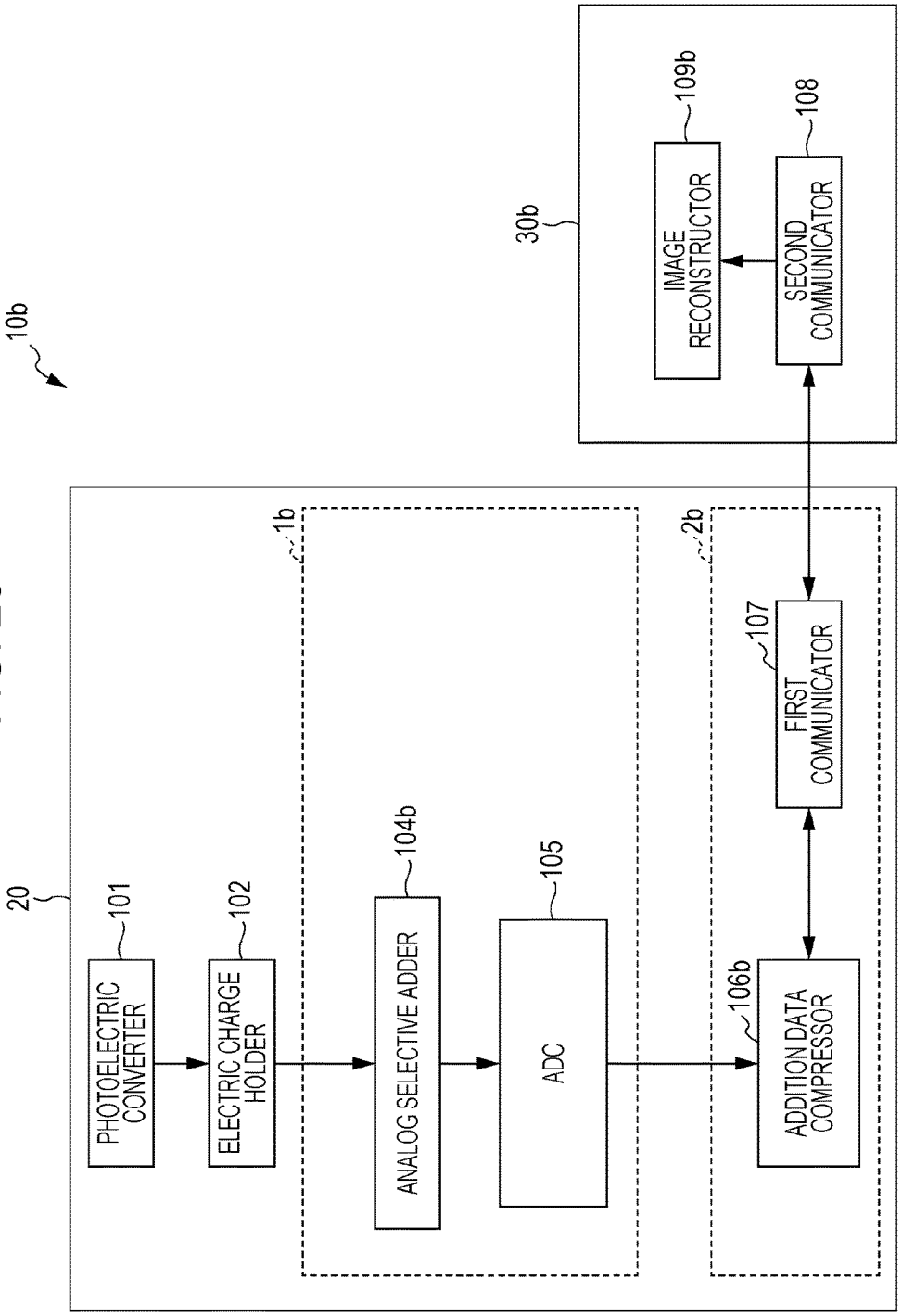
FIG. 20 is a diagram illustrating the configuration of an imaging system according to a second modification example of the imaging system illustrated in FIG. 1.

FIG. 20 illustrates the configuration of an imaging system 10b according to a second modification example of the imaging system 10 (FIG. 1). The imaging system 10b does not include the above-described multiple sampling information setter 103. This is because multiple sampling information is predetermined. Thus, each of an analog selective adder 104b of a coding apparatus 1b, an addition data compressor 106b of a compressing apparatus 2b, and an image reconstructor 109b of a reconstruction apparatus 30b stores the predetermined multiple sampling information in a storage device (not illustrated) such as a semiconductor memory. Other than the point described above, the configuration and operation of the imaging system 10b are the same as those of the imaging system 10 (FIG. 1).

According to the description given above, the compressing apparatus 2 includes the first communicator 107 that transmits compressed data, but this configuration is not necessary. A storage device that stores compressed data and multiple sampling information may be provided instead of the first communicator 107. The storage device may be, for example, a semiconductor memory such as a flash memory, a magnetic storage device such as a hard disk drive, or an optical recording medium such as an optical disc. In this configuration, it is not necessary for the decoding apparatus 30 to spatially and/or temporally coexist with the imaging apparatus 20. For example, the reconstruction apparatus 30 installed at a spatially distant position may perform reproduction by using compressed data and multiple sampling information stored in a flash memory. The storage device and the first communicator 107 may coexist.

Figure 21:
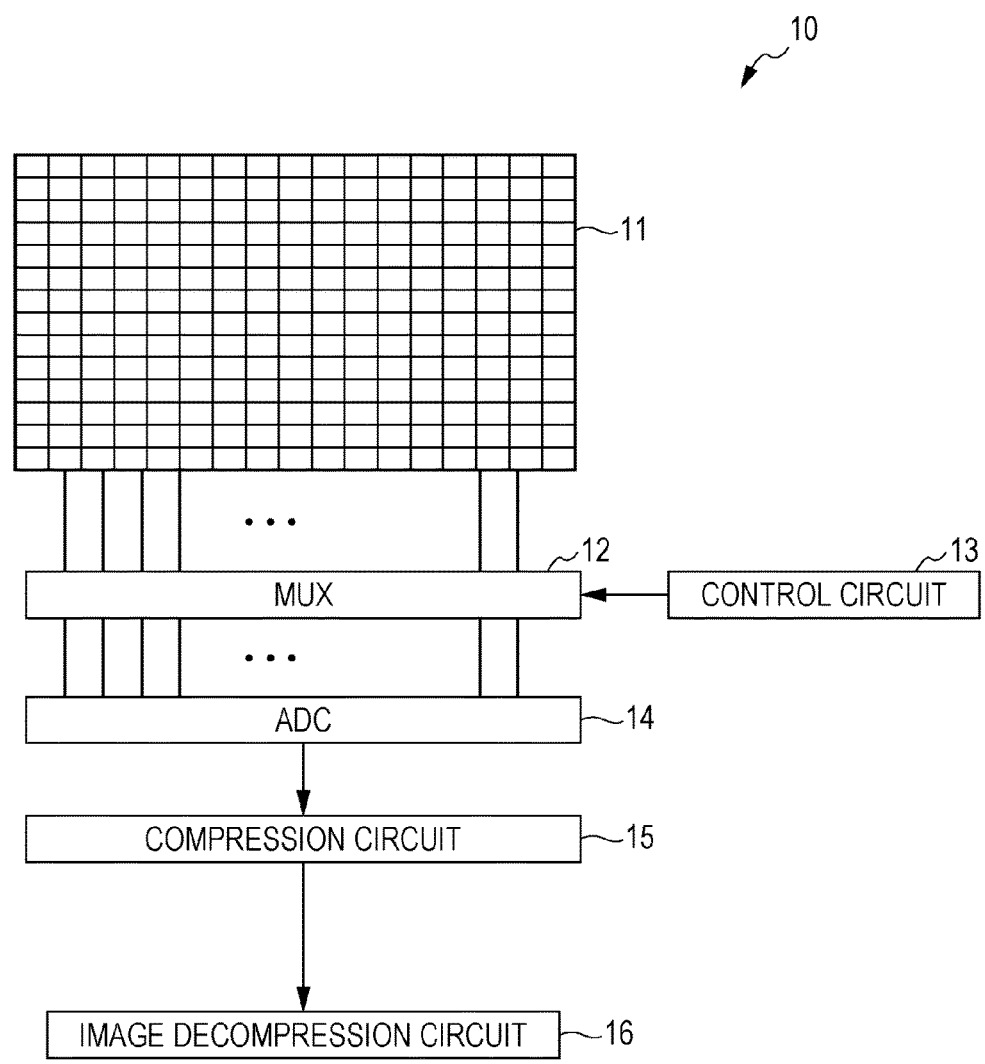
FIG. 21 is a diagram illustrating an example of the hardware configuration of the imaging system according to an exemplary embodiment of the present disclosure.

FIG. 21 illustrates an example of the hardware configuration of the imaging system 10 according to an embodiment of the present disclosure. The imaging system 10 includes the imaging device 11, a multiplexer (MUX) 12, a control circuit 13, an analog-to-digital converter (ADC) 14, a compression circuit 15, and an image reconstruction circuit 16.

The imaging device 11 is a pixel array constituted by a plurality of pixels. The imaging device 11 converts light signals generated from received light into electric signals. More specifically, each pixel of the imaging device 11 receives light, stores electric charge corresponding to the amount of incident light, and outputs the electric charge. The imaging device 11 is a so-called image sensor and corresponds to the photoelectric converter 101 having a light receiving element group and the electric charge holder 102. The MUX 12 performs processing of adding pixel values (electric charge signals) of a plurality of pixels, that is, the above-described selective addition processing. The MUX 12 corresponds to the analog selective adder 104 of the coding apparatus 1.

The control circuit 13 generates a control signal for controlling the selective addition processing performed by the MUX 12 and outputs the control signal to the MUX 12. This control signal is multiple sampling information, and the control circuit 13 corresponds to the multiple sampling information setter 103. The control circuit 13 does not need to exist to control selective addition processing. For example, if the control circuit 13 functions as a signal processing processor that operates in accordance with a computer program, the signal processing processor may control some or all of the analog-to-digital conversion processing, addition data compression processing, communication processing, and so on which will be described below.

The ADC 14 converts analog electric charge signals obtained as a result of selective addition processing into digital data. The ADC 14 is a ΔΣ-type ADC that is constituted by connecting in series a ΔΣ modulator and a digital filter (both are not illustrated). The ΔΣ modulator receives an analog signal and converts it into a pulse waveform (digital waveform) of 1 bit that is sampled at rate higher than an assumed sampling rate. The digital filter performs band limitation and decimation on the pulse wave and outputs digital data of many bits having the assumed sampling rate. The ADC 14 corresponds to the ADC 105.

The compression circuit 15 compresses the data digitalized by the ADC 14 and thereby reduces the amount of data. The compression circuit 15 needs to perform mathematical operations expressed by equations (4) to (6) and thus may be installed as a math coprocessor or the like. The compression circuit 15 corresponds to the addition data compressor 106.

The image reconstruction circuit 16 decodes addition data on the basis of the digital data compressed by the compression circuit 15 and further generates an image that would be originally generated by the imaging device 11 by using a compressed sampling technique. That is, the image reconstruction circuit 16 decompresses or reconstructs an image.

An imaging system according to an exemplary embodiment of the present disclosure that uses compressed sensing that can realize lower power consumption, a higher SN ratio, and a reduced communication band is useful to reduce transmission data while improving image quality.

What is claimed is:

1. An imaging apparatus comprising:
   a photoelectric converter that converts light signals generated from light received by three or more pixels into electric charge signals, each of the electric charge signals corresponding to one of the three or more pixels;
   an electric charge holder that holds the electric charge signals for the three or more pixels resulting from conversion;
   an analog selective adder that generates a plurality of added electric charge signals by adding electric charge signals of a certain plurality of pixels among the three or more pixels by using a plurality of analog addition patterns which are rules of adding pieces of electric charge information corresponding to individual positions of the certain plurality of pixels;
   an analog-to-digital converter that converts the plurality of added electric charge signals into a plurality of digital signals; and
   an addition data compressor that compresses the plurality of digital signals by using a total number of pixels for which pieces of electric charge information are added in the plurality of analog addition patterns and thereby generates compressed digital signals.

2. The imaging apparatus according to claim 1, wherein the addition data compressor calculates an average value or a median value of the plurality of digital signals resulting from conversion performed by the analog-to-digital converter, compresses difference signals each representing a difference between the calculated average value or median value and a corresponding one of the plurality of digital signals, and thereby generates compressed digital signals.

3. The imaging apparatus according to claim 1, wherein the addition data compressor compresses the plurality of digital signals by using entropy coding and thereby generates compressed digital signals.

4. The imaging apparatus according to claim 1, further comprising:
   a first communicator that transmits the compressed digital signals and the plurality of analog addition patterns.

5. The imaging apparatus according to claim 4, wherein the first communicator transmits the compressed digital signals and the plurality of analog addition patterns by using a first format in which a header portion includes the plurality of analog addition patterns and a body portion includes the compressed digital signals or a second format in which a header portion includes the compressed digital signals and a body portion includes the plurality of analog addition patterns.

6. The imaging apparatus according to claim 5, wherein the plurality of analog addition patterns in the header portion in the first format are encrypted, and the plurality of analog addition patterns in the body portion in the second format are encrypted.

7. An imaging system comprising:
the imaging apparatus according to claim 4; and
a reconstruction apparatus,
wherein the reconstruction apparatus includes
a second communicator that receives the compressed digital signals and the plurality of analog addition patterns, and
an image reconstructor that decompresses the compressed digital signals by using the plurality of analog addition patterns and obtains image information generated through imaging performed by the imaging apparatus.

8. A reconstruction apparatus included in the imaging system according to claim 7.

9. An imaging apparatus comprising:
a photoelectric converter that converts light signals generated from light received by three or more pixels into electric charge signals, each of the electric charge signals corresponding to one of the three or more pixels;
an electric charge holder that holds the electric charge signals for the three or more pixels resulting from conversion;
an analog selective adder that generates a plurality of added electric charge signals by adding electric charge signals of a certain plurality of pixels among the three or more pixels by using a plurality of analog addition patterns which are rules of adding pieces of electric charge information corresponding to individual positions of the certain plurality of pixels by applying a weight to the pieces of electric charge information;
an analog-to-digital converter that converts the plurality of added electric charge signals into a plurality of digital signals; and
an addition data compressor that compresses the plurality of digital signals by using an addition result of the pieces of electric charge information with the weight in the plurality of analog addition patterns and thereby generates compressed digital signals.

10. An imaging method comprising:
converting light signals generated from light received by three or more pixels into electric charge signals, each of the electric charge signals corresponding to one of the three or more pixels;
generating a plurality of added electric charge signals by adding electric charge signals of a certain plurality of pixels among the three or more pixels by using a plurality of analog addition patterns which are rules of adding pieces of electric charge information corresponding to individual positions of the certain plurality of pixels;
converting the plurality of added electric charge signals into a plurality of digital signals; and
compressing the plurality of digital signals by using a total number of pixels for which pieces of electric charge information are added in the plurality of analog addition patterns and thereby generating compressed digital signals.

11. The imaging method according to claim 10, further comprising:
transmitting the compressed digital signals and the plurality of analog addition patterns.

12. The imaging method according to claim 11, wherein the transmitting includes transmitting the compressed digital signals and the plurality of analog addition patterns by using a first format in which a header portion includes the plurality of analog addition patterns and a body portion includes the compressed digital signals or a second format in which a header portion includes the compressed digital signals and a body portion includes the plurality of analog addition patterns.

13. The imaging method according to claim 11, wherein
the plurality of analog addition patterns in the header portion in the first format are encrypted,
the plurality of analog addition patterns in the body portion in the second format are encrypted, and
the transmitting includes transmitting the compressed digital signals and the plurality of analog addition patterns by using a first format in which a header portion includes the plurality of analog addition patterns that are encrypted and a body portion includes the compressed digital signals or a second format in which a header portion includes the compressed digital signals and a body portion includes the plurality of analog addition patterns that are encrypted.

14. A recording medium storing a control program that causes an apparatus including a processor to perform processing, the recording medium being non-volatile and computer-readable, the processing comprising:
converting light signals generated from light received by three or more pixels into electric charge signals, each of the electric charge signals corresponding to one of the three or more pixels;
generating a plurality of added electric charge signals by adding electric charge signals of a certain plurality of pixels among the three or more pixels by using a plurality of analog addition patterns which are rules of adding pieces of electric charge information corresponding to individual positions of the certain plurality of pixels;
converting the plurality of added electric charge signals into a plurality of digital signals; and
compressing the plurality of digital signals by using a total number of pixels for which pieces of electric charge information are added in the plurality of analog addition patterns and thereby generating compressed digital signals.

15. The recording medium according to claim 14, the processing further comprising:
transmitting the compressed digital signals and the plurality of analog addition patterns.

16. An imaging apparatus comprising:
a photoelectric converter that includes a first plurality of pixels which receive light and which output a first plurality of electric charge signals, the first plurality of pixels corresponding to the first plurality of electric charge signals in a one-to-one relationship, and each of the first plurality of pixels outputting a corresponding one of the first plurality of electric charge signals;
an analog selective adder that outputs a plurality of added electric charge signals, the plurality of added electric charge signals corresponding to a plurality of pieces of designation information in a one-to-one relationship, each of the plurality of added electric charge signals being obtained by adding a plurality of electric charge signals output from a plurality of pixels designated by a corresponding one of the plurality of pieces of designation information, the plurality of pieces of designation information being different from one another, the plurality of pixels that are designated corresponding to the plurality of electric charge signals in a one-to-one relationship, the plurality of pixels that are designated being included in the first plurality of pixels, and the plurality of electric charge signals being included in the first plurality of electric charge signals;

an analog-to-digital converter that converts each of the plurality of added electric charge signals into a digital value and thereby outputs a plurality of digital values; and an addition data compressor that generates a first plurality of digital values by using the plurality of digital values and a total number of the plurality of pixels that are designated, wherein a total number of the first plurality of electric charge signals is larger than a total number of the plurality of added electric charge signals, and the total number of the plurality of added electric charge signals is larger than a total number of the plurality of electric charge signals.

17. The imaging apparatus according to claim 16, wherein the addition data compressor obtains, based on values obtained by dividing each of the plurality of digital values by the total number of the plurality of pixels, the first plurality of digital values.

\* \* \* \* \*